United States Patent

Miller

[11] Patent Number: 6,101,481
[45] Date of Patent: Aug. 8, 2000

[54] TASK MANAGEMENT SYSTEM

[75] Inventor: Neil G. Miller, Wanniassa, Australia

[73] Assignee: Taskey Pty Ltd., Australia

[21] Appl. No.: 09/101,113

[22] PCT Filed: Jan. 15, 1997

[86] PCT No.: PCT/AU97/00018

§ 371 Date: Jun. 30, 1998

§ 102(e) Date: Jun. 30, 1998

[87] PCT Pub. No.: WO97/27555

PCT Pub. Date: Jul. 31, 1997

[30] Foreign Application Priority Data

Jan. 25, 1996 [AU] Australia ............... PN 7734

[51] Int. Cl.$^7$ .................................................. G06F 17/60
[52] U.S. Cl. ............................ 705/9; 705/8; 705/11
[58] Field of Search .................... 705/8, 9, 1, 11, 705/7

[56] References Cited

U.S. PATENT DOCUMENTS

| | | | |
|---|---|---|---|
| 5,557,515 | 9/1996 | Abbruzzese et al. | 705/9 |
| 5,655,086 | 8/1997 | Jury et al. | 705/9 |
| 5,671,360 | 9/1997 | Hambrick et al. | 705/9 |
| 5,765,140 | 6/1998 | Knudson et al. | 705/9 |
| 5,767,848 | 6/1998 | Matsuzaki et al. | 345/331 |
| 5,836,011 | 11/1998 | Hambrick et al. | 705/8 |

OTHER PUBLICATIONS

Pfleeger, Shari Lawrence, Software Engineering: The Production of Quality Software, Second Edition, Macmillan Publishing Company, 1991.

Goldberg, Steven, "The Virtual Watercooler", Network World, Apr. 10, 1995.

Pompoli, Tony, "Let's Talk", PC Magazine, vol. 14, No. 20, Nov. 21, 1995.

Primary Examiner—Stephen R. Tkacs
Assistant Examiner—George D. Morgan
Attorney, Agent, or Firm—Pendorf & Cutliff

[57] ABSTRACT

A method is described of managing a plurality of tasks to be carried out by a plurality of personnel, each of the tasks having identified task details relevant thereto, in which the method includes: identifying task personnel who will be directly involved in carrying out each task; allocating sole responsibility for each task to a task controller, and transferring task details to and/or between task personnel and controllers such that task details relevant to a task are provided to and accessible by only the task controller and the task personnel for the task; wherein recommendations for modifying task details relevant to a task can only be made by task personnel for the task, and wherein a task or task details for a task can only be modified by the task controller for the task and/or an administrator, the method utilizes a data processing assembly operable under the control of program means embodied on a machine-readable storage medium that provides a task management system for coordinating the plurality of tasks, and the task management system includes: transfer means for transferring the task details to and/or between the task personnel and controllers; recommendation protocol means for establishing a protocol that the recommendations for modifying task details relevant to a task can only be made by the task personnel for the task, and modification protocol means for establishing a protocol that the modifications to a task or the task details for a task can only be made by the task controller for the task and/or the administrator.

17 Claims, 29 Drawing Sheets

IDENTIFYING RELEVANT TASKS
IN A BREAKDOWN STRUCTURE

SAMPLE PROJECTS AND TASKS

FIG. 1 - IDENTIFYING RELEVANT TASKS IN A BREAKDOWN STRUCTURE
SAMPLE PROJECTS AND TASKS
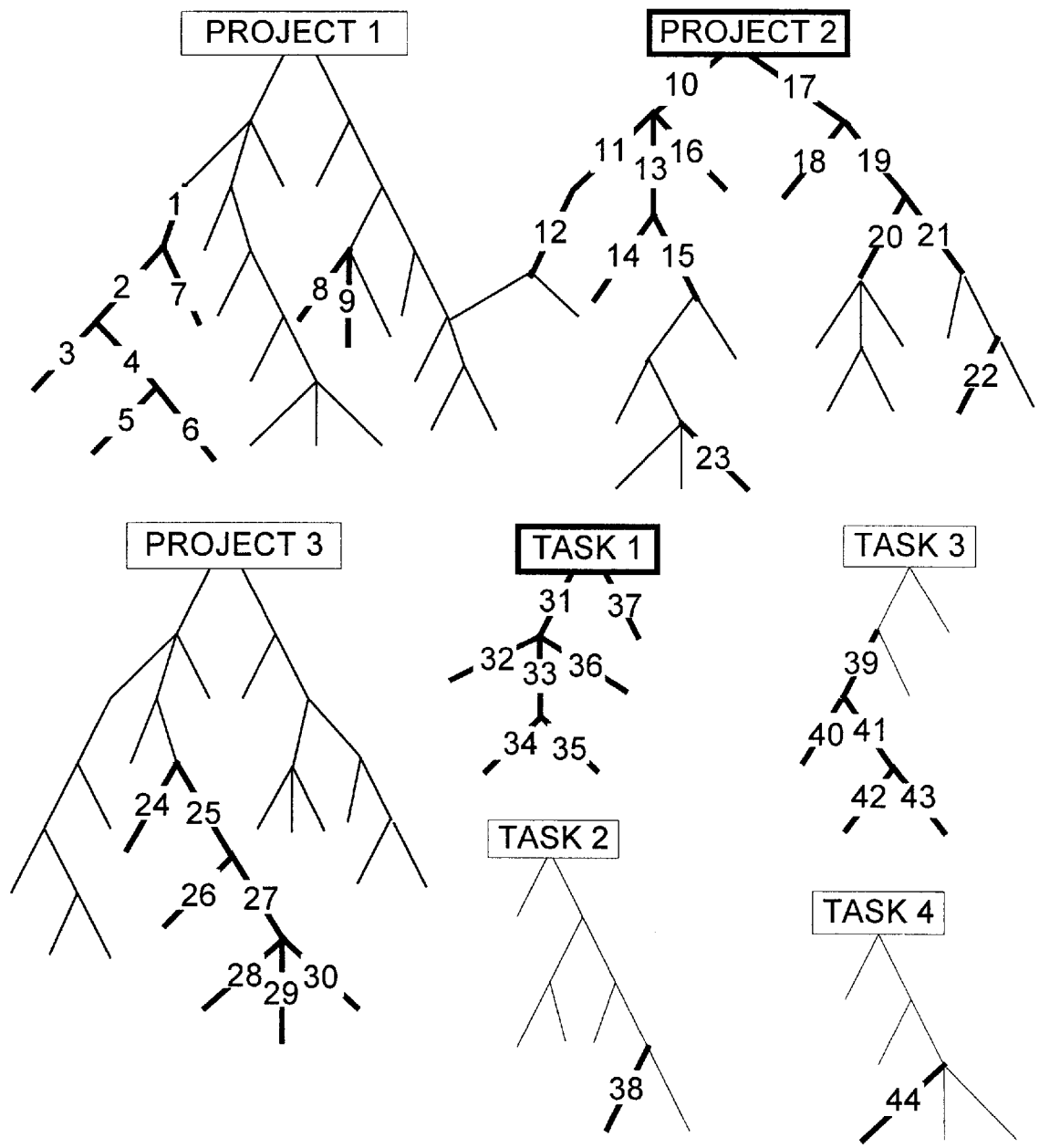
JOINS FIG. 1A (BELOW) - (LEGEND ON FIG. 1A)

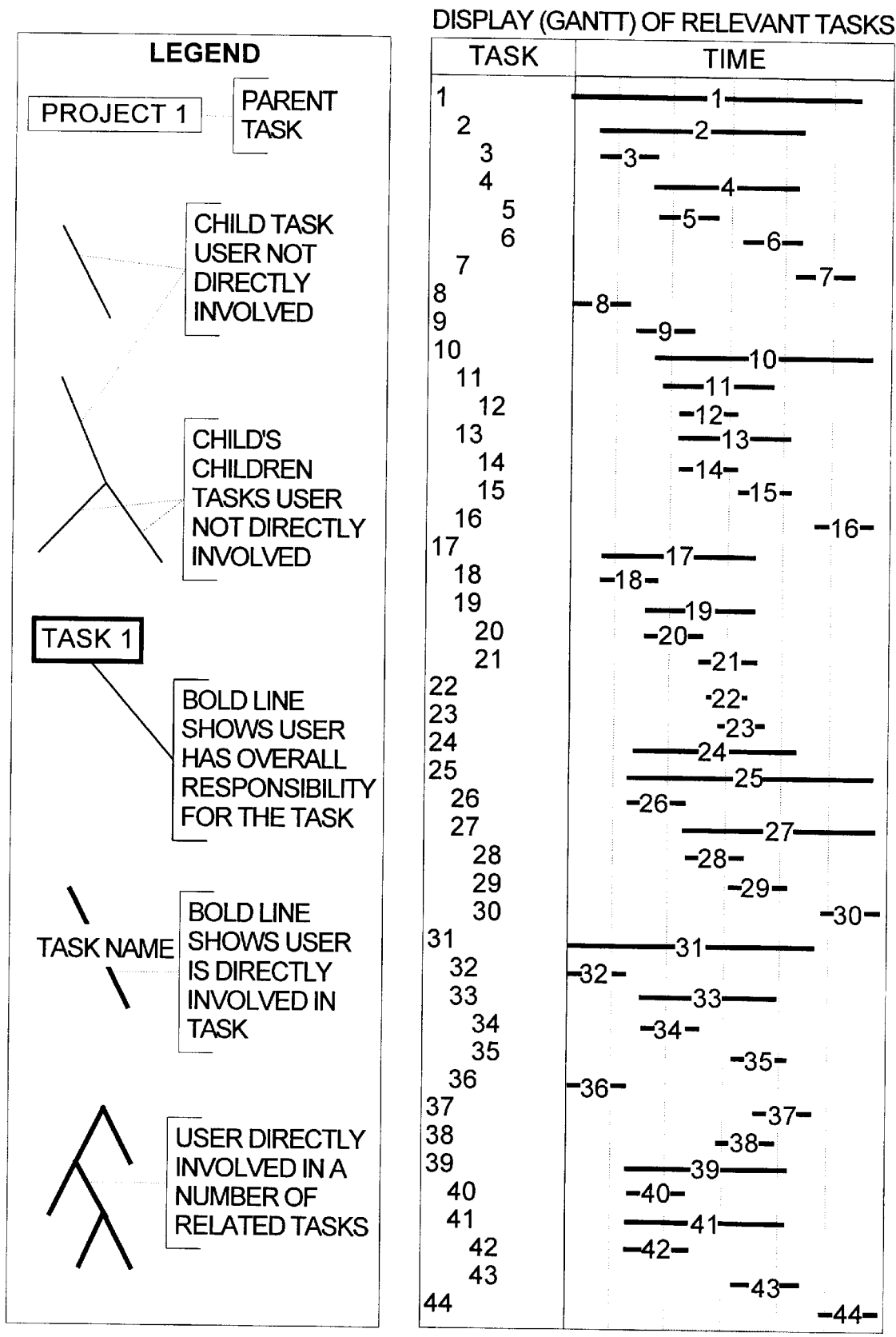
FIG. 1A JOINS FIG. 1 (ABOVE)

FIG. 2 - TASKey PLAN TEMPLATE

| TASK NAME: | TASK REFERENCE: |
|---|---|
| AIM (WHAT IS TO BE ACHIEVED) | |

| ASSUMPTIONS (KEY ASSUMPTIONS FOR THE PLAN) | WHO IS RESPONSIBLE |
| | START / COMPLETE |
| | AGGREGATE COST / PLAN COST |
| OBJECTIVES (WHAT SUCCESS LOOKS LIKE) | ACTIONS (WHAT HAS TO BE DONE BY WHO) |
| PEOPLE INVOLVED | RESOURCES |
| NOTES | |

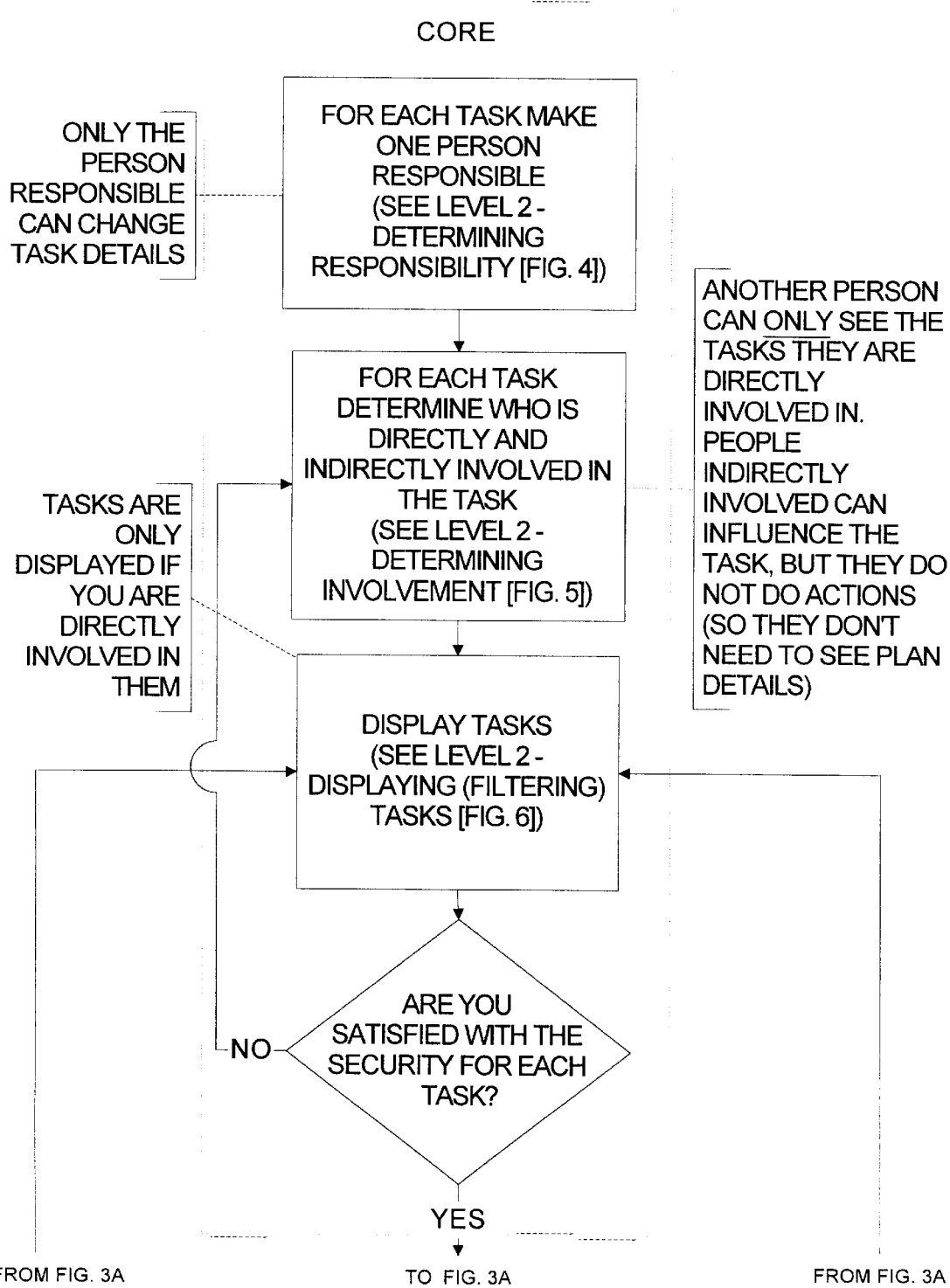
FIG. 3 - PROCESS FOR COORDINATING, SHARING & SECURING TASK DETAILS
LEVEL 1 - PROCESS OVERVIEW

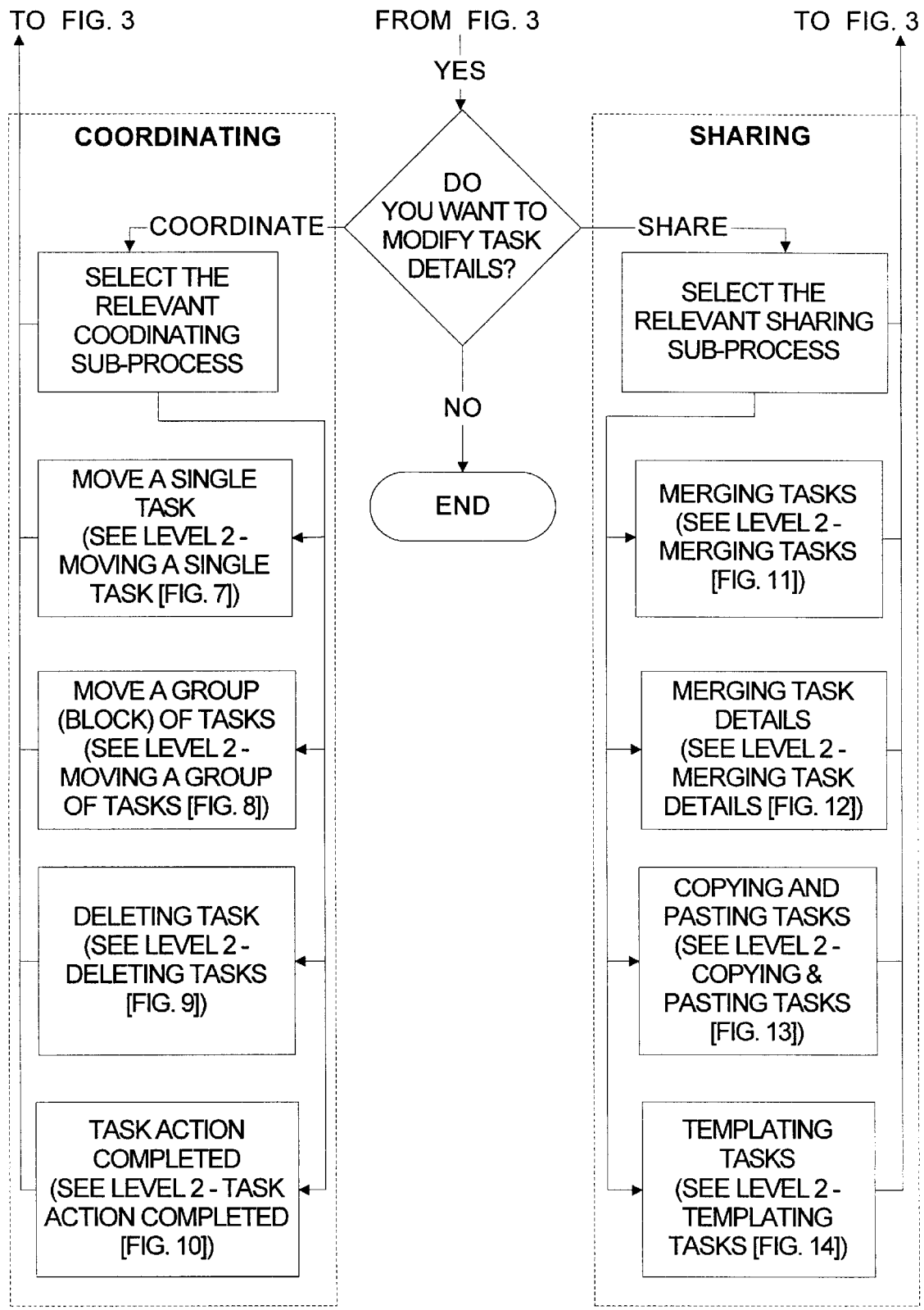

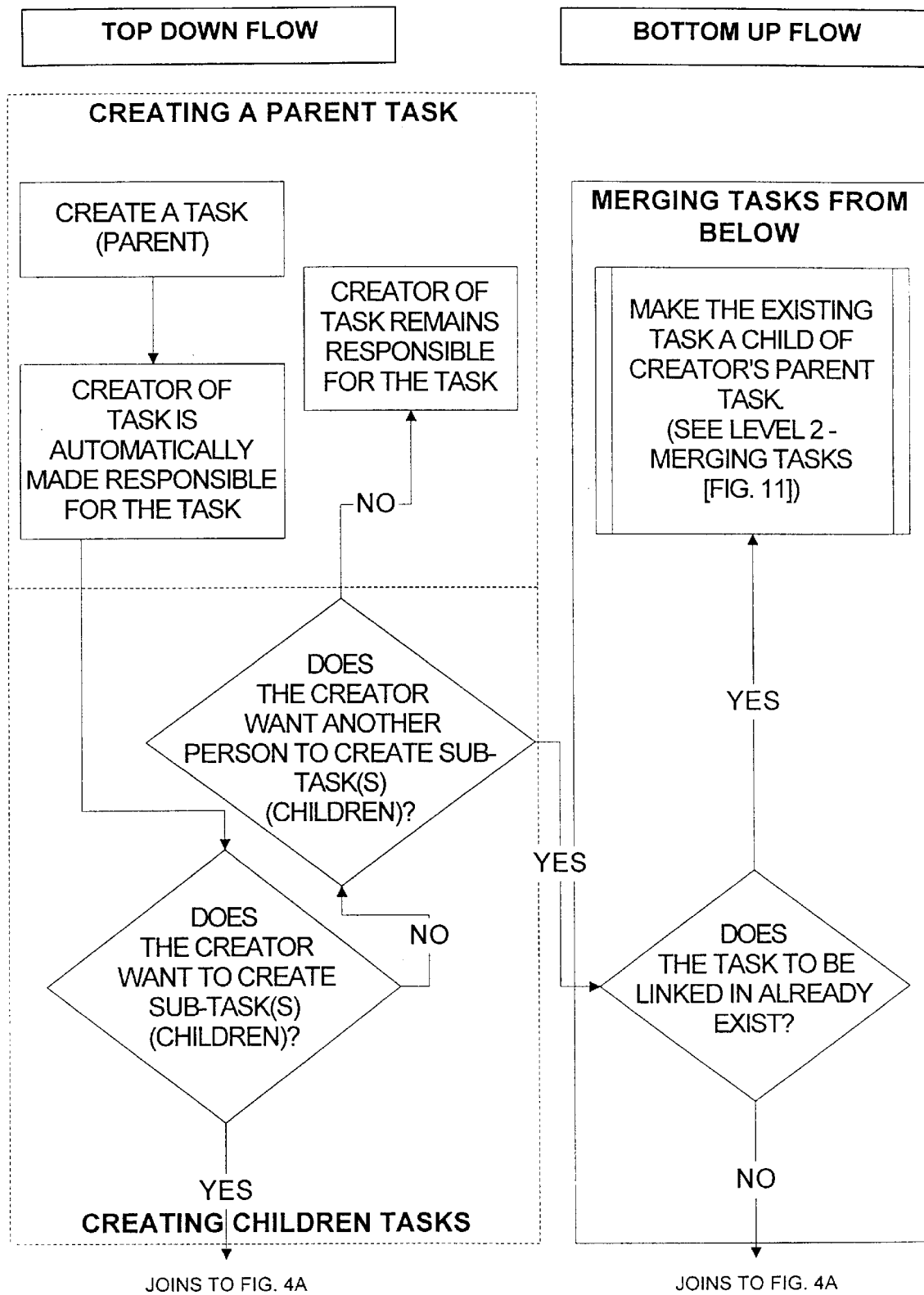
FIG. 4 - CORE LEVEL 2 - DETERMINING RESPONSIBILITY TOP DOWN FLOW & BOTTOM UP FLOW

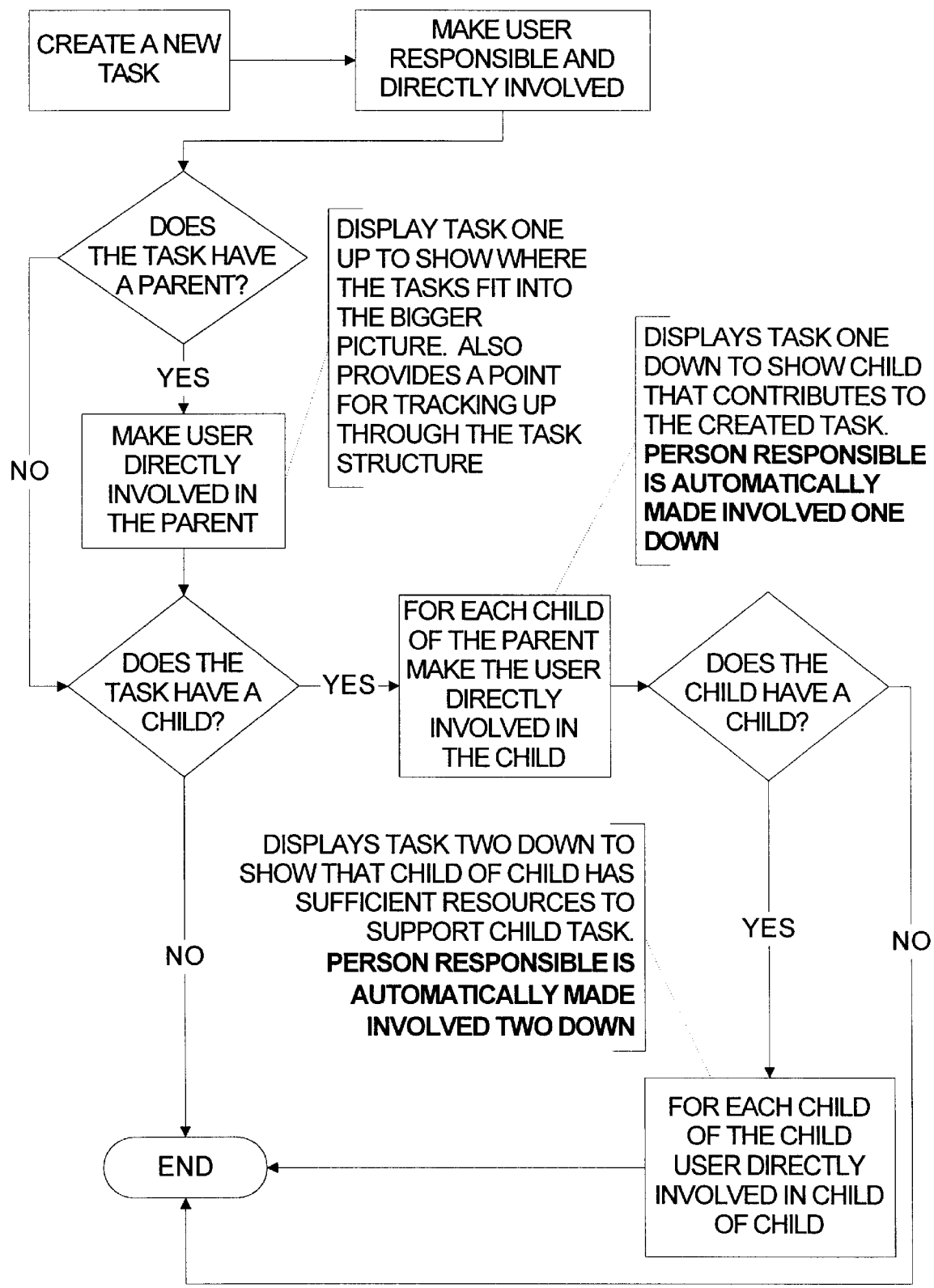
FIG. 5 - CORE
Level 2 - DETERMINING INVOLVEMENT

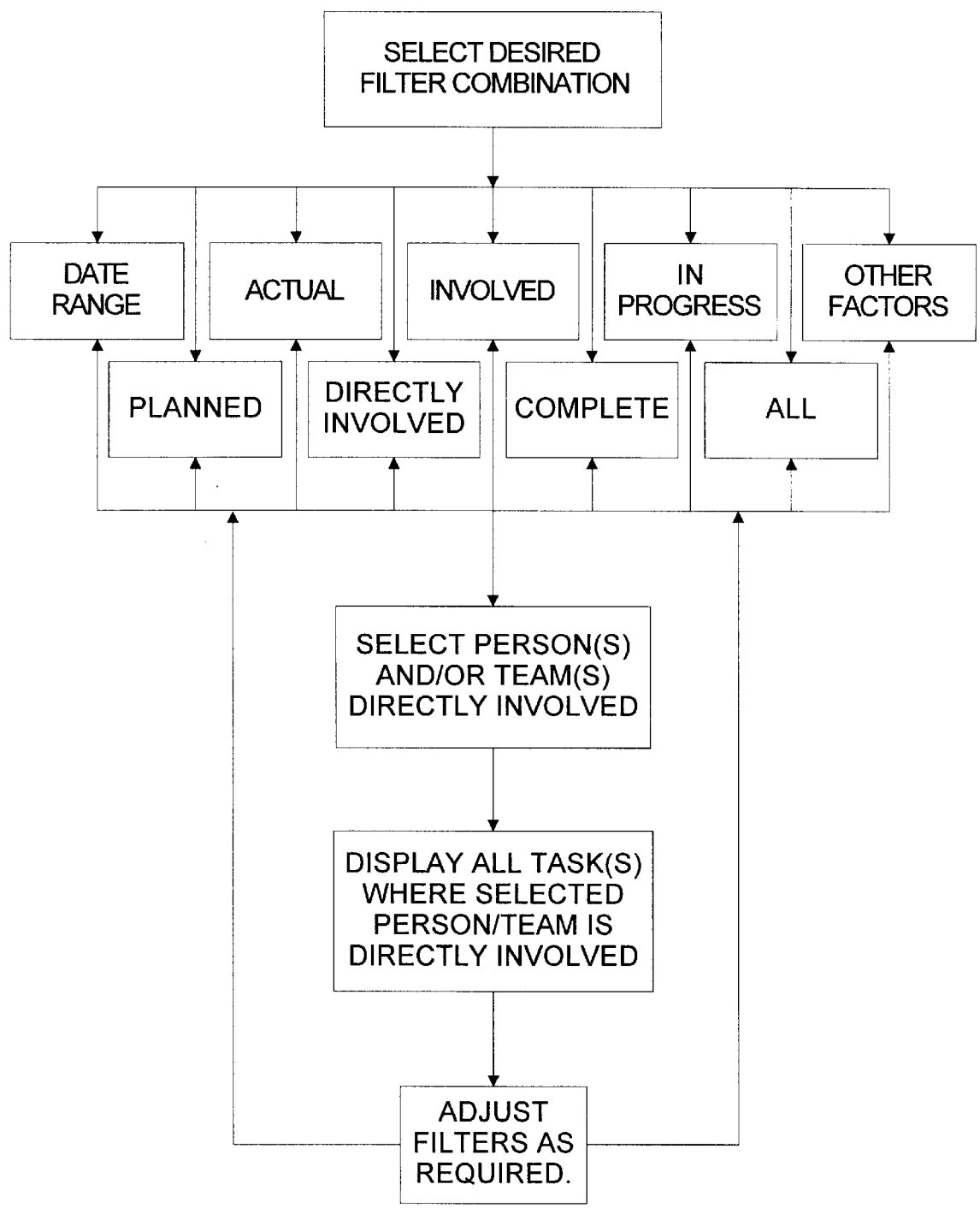
FIG. 6 - CORE
LEVEL 2 - DISPLAYING (FILTERING) TASKS

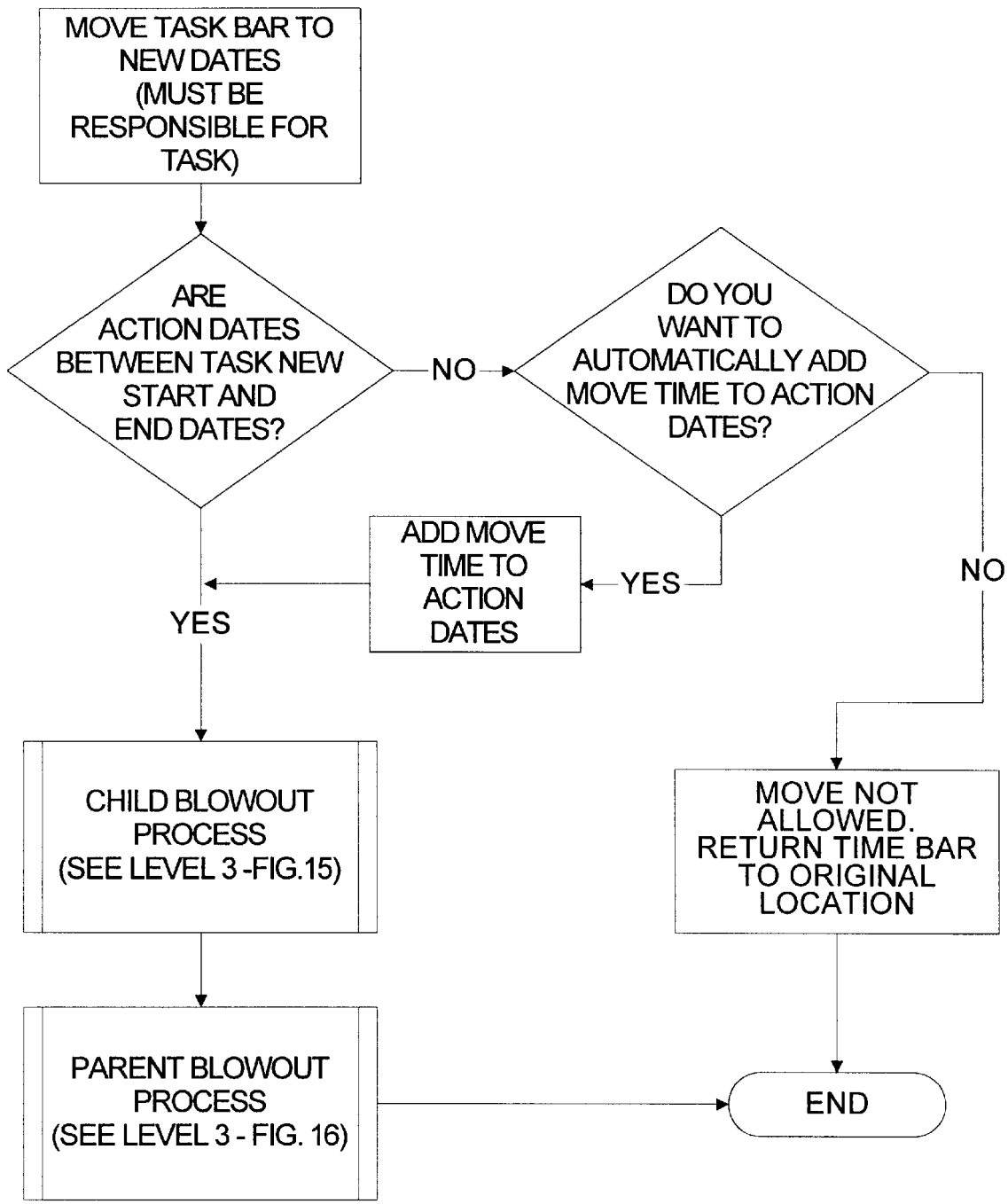
FIG. 7 - COORDINATING LEVEL 2 - MOVING A SINGLE TASK

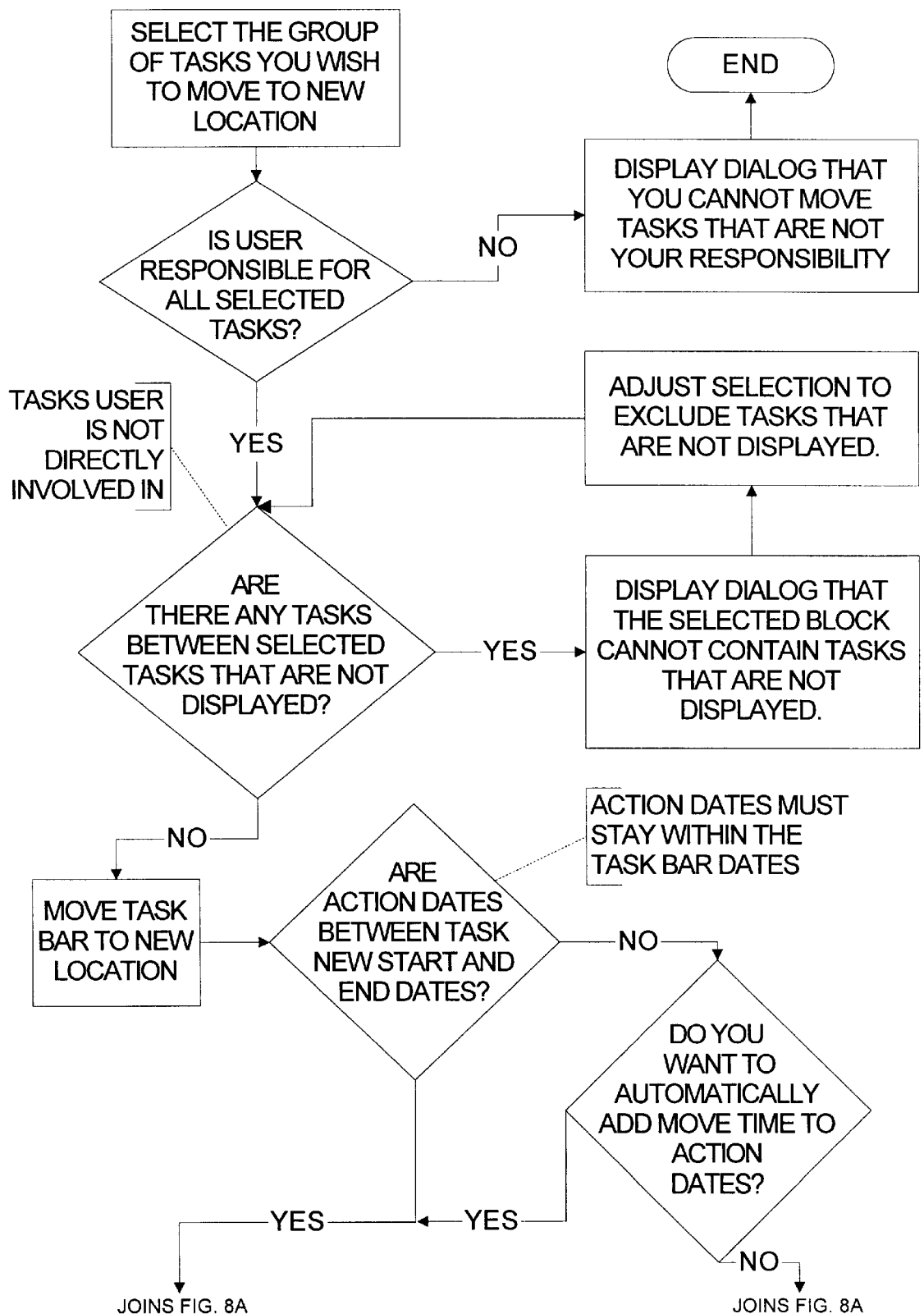

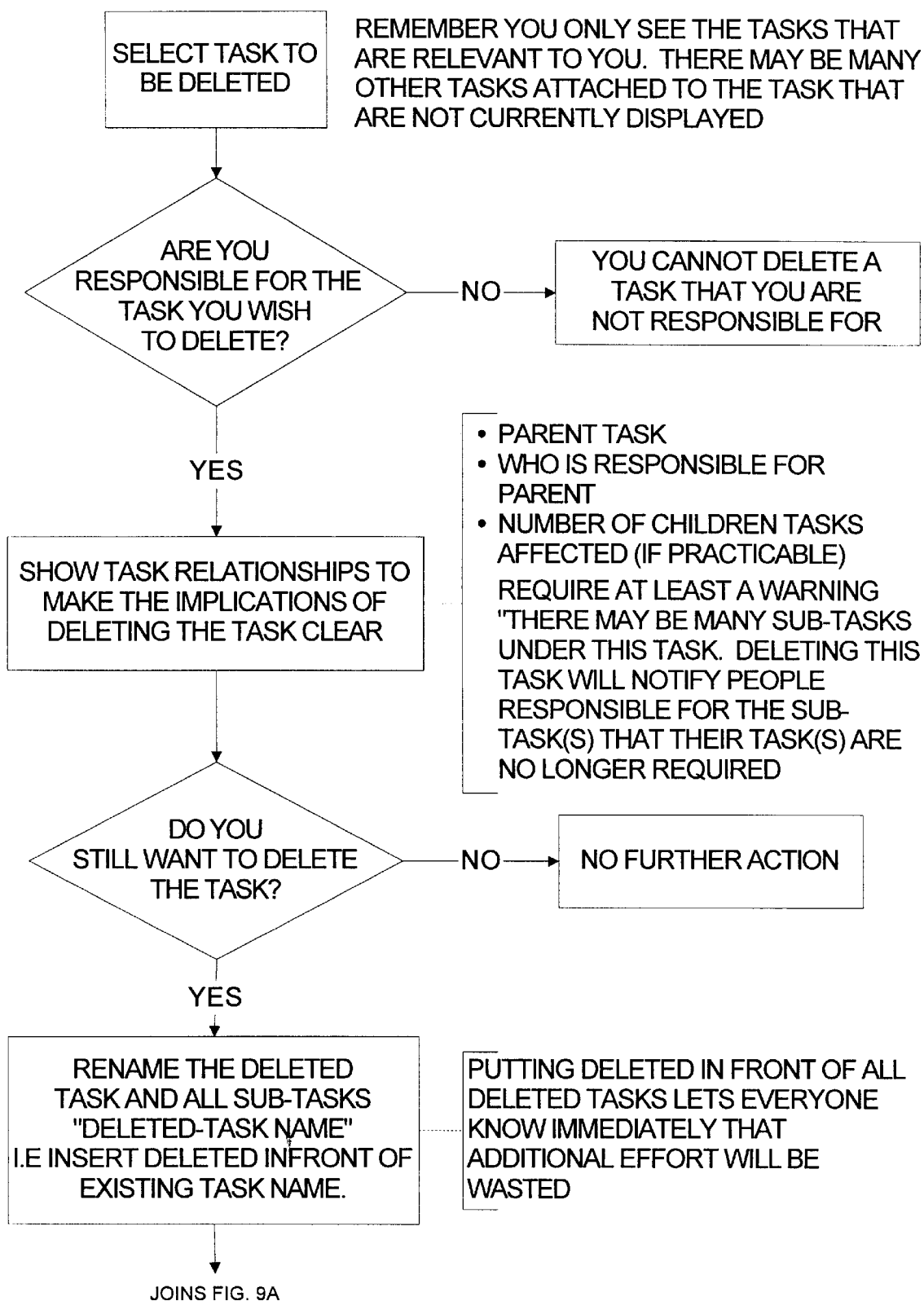
FIG. 9 - COORDINATING
Level 2 - DELETING TASKS

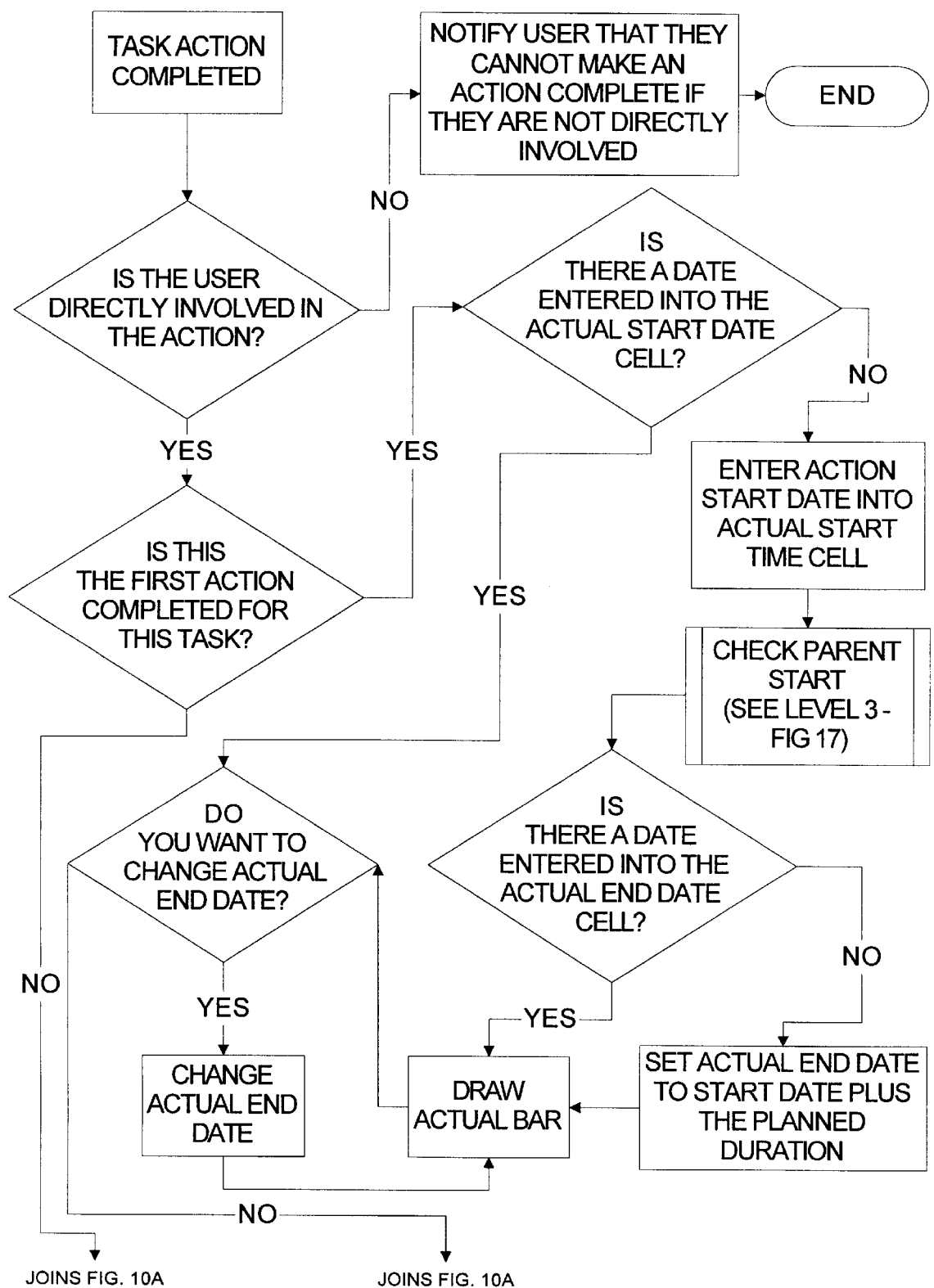
FIG. 10 - COORDINATING LEVEL 2 - TASK ACTION COMPLETED

FIG. 11 - SHARING
LEVEL 2 - MERGING TASKS
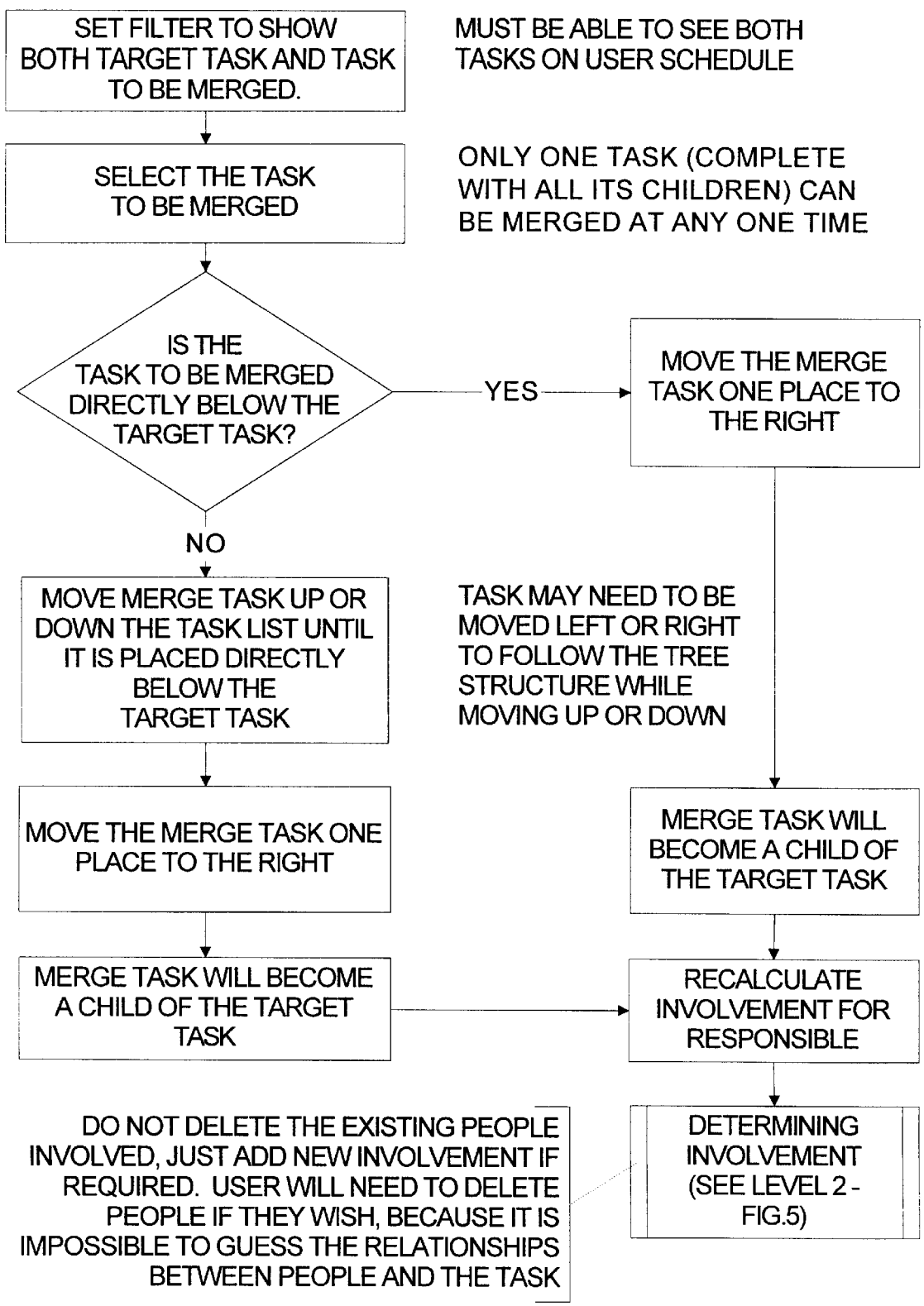

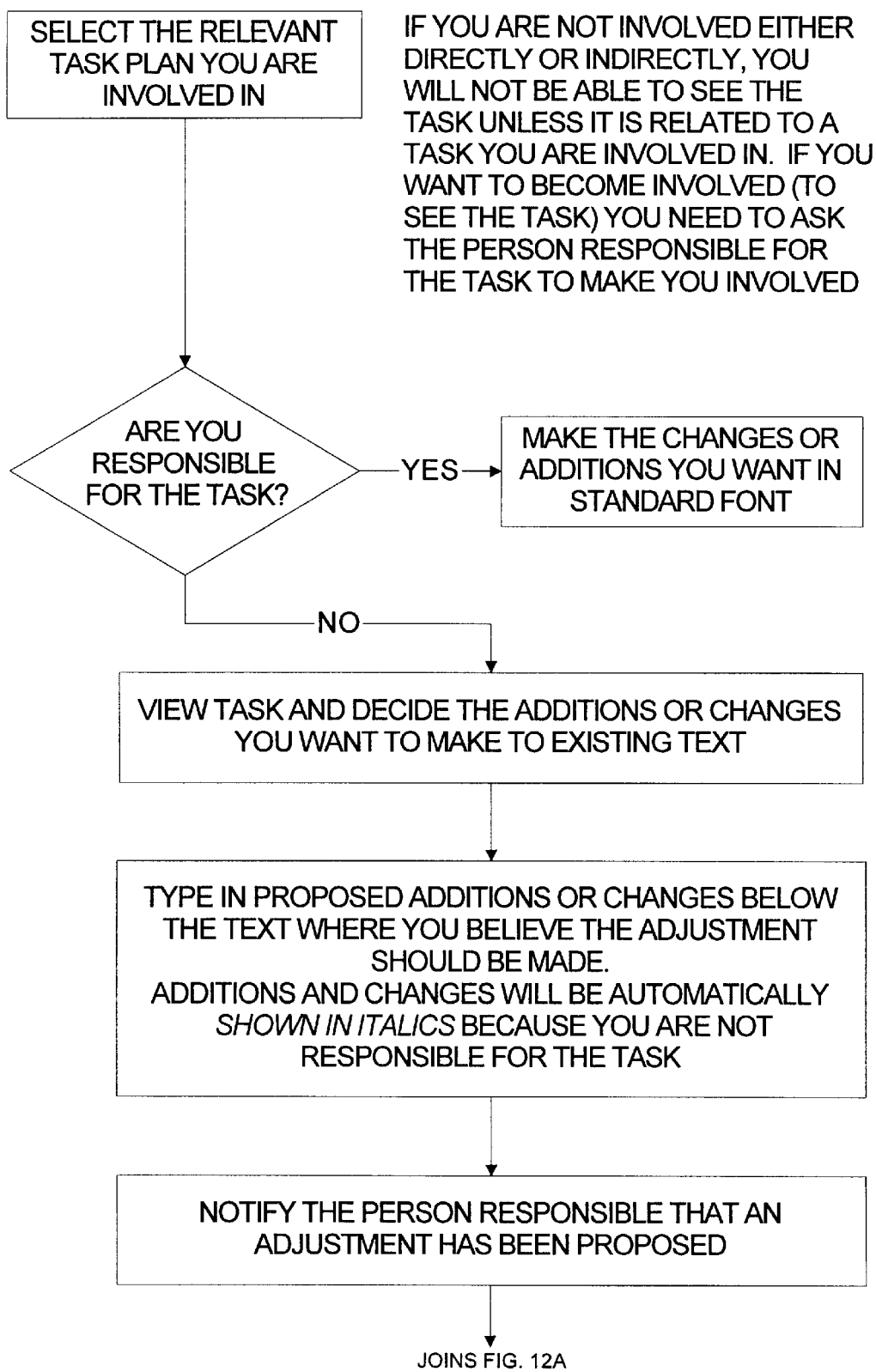
FIG. 12 - SHARING LEVEL 2 - MERGING TASK DETAIL

FIG. 13 - SHARING
LEVEL 2 - COPYING & PASTING TASKS
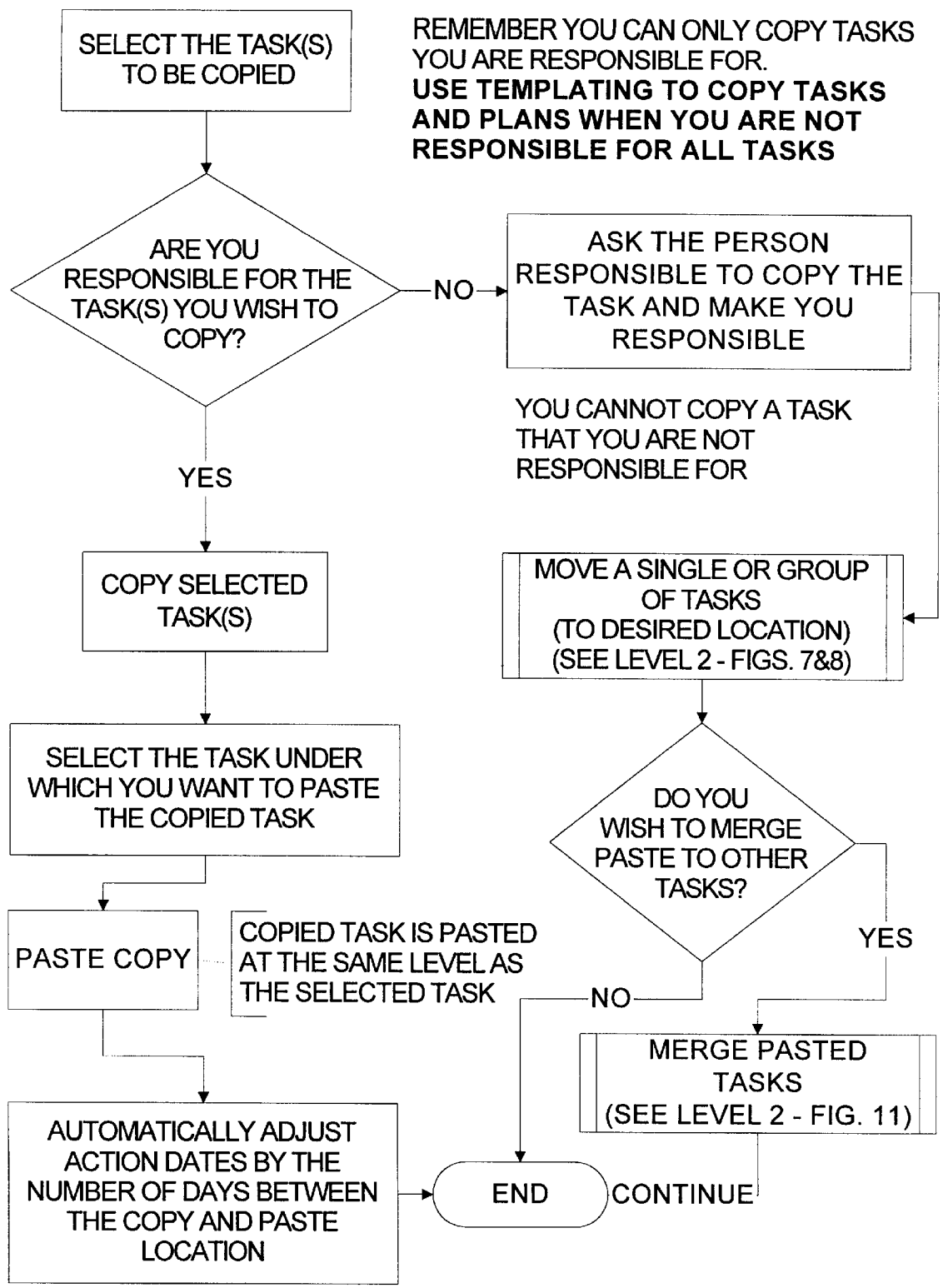

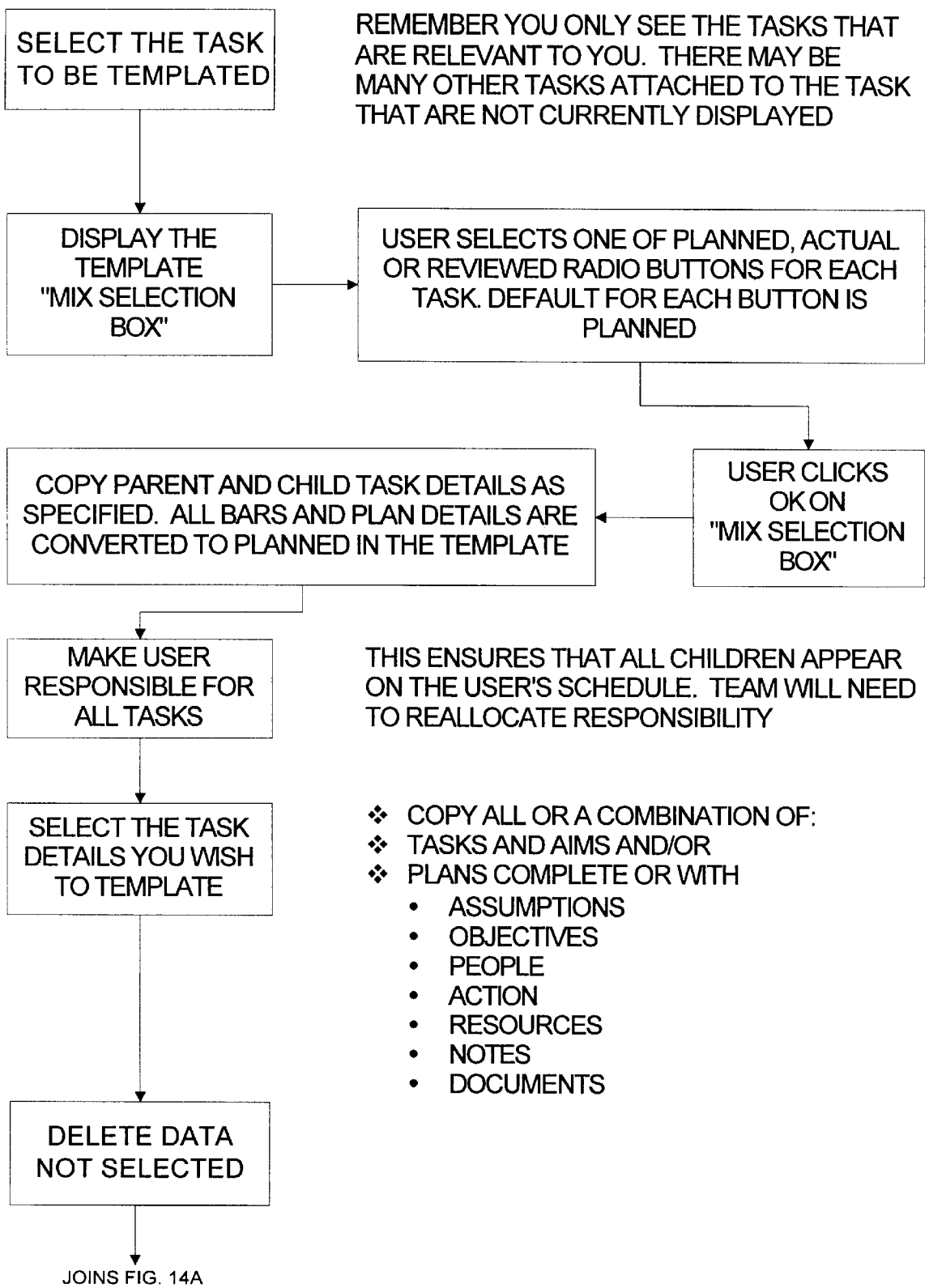
FIG. 14 - SHARING LEVEL 2 - TEMPLATING TASKS

FIG. 15 - COORDINATING AND SHARING
LEVEL 3 - CHILD TASK BLOWOUT
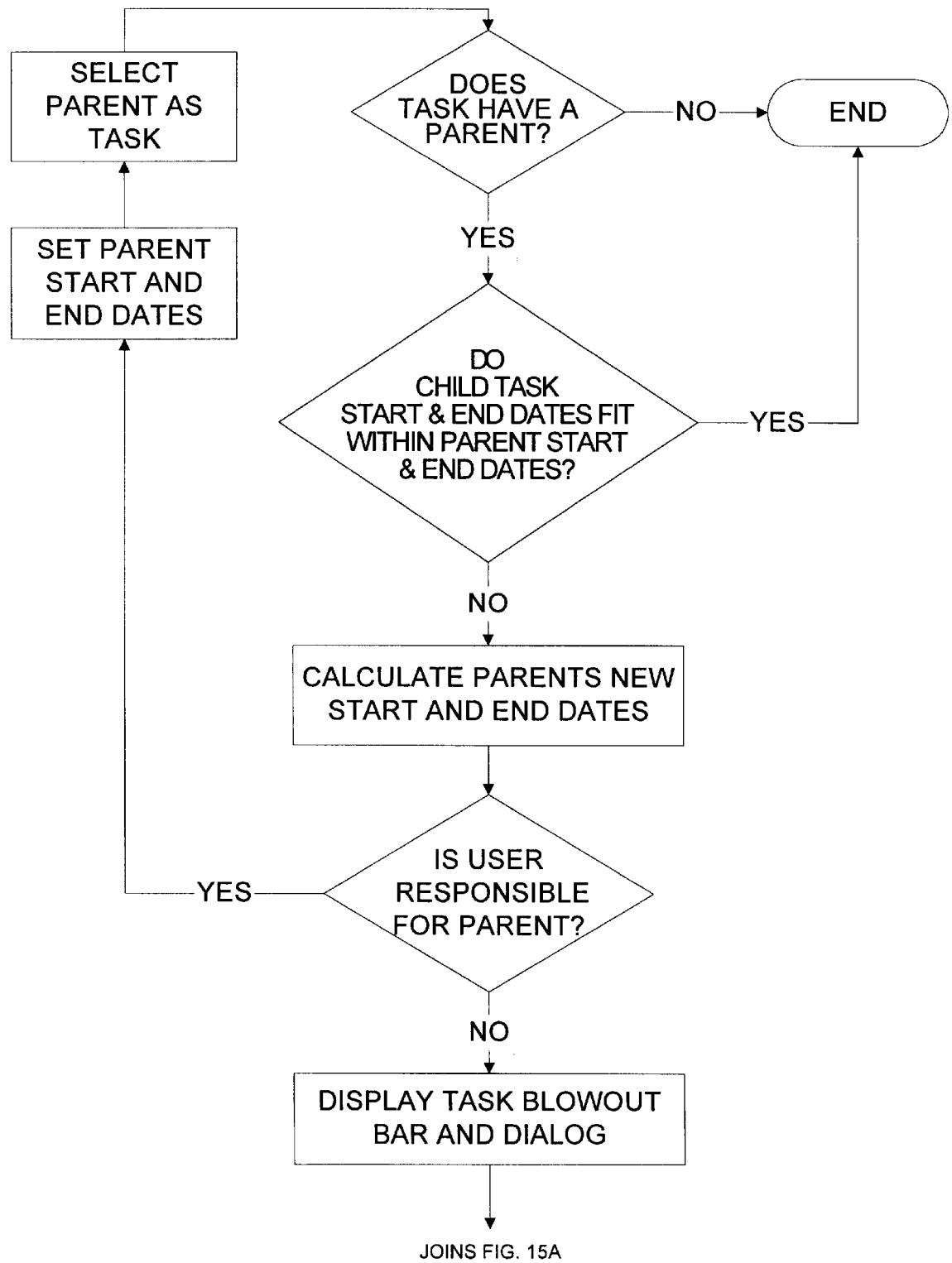
JOINS FIG. 15A

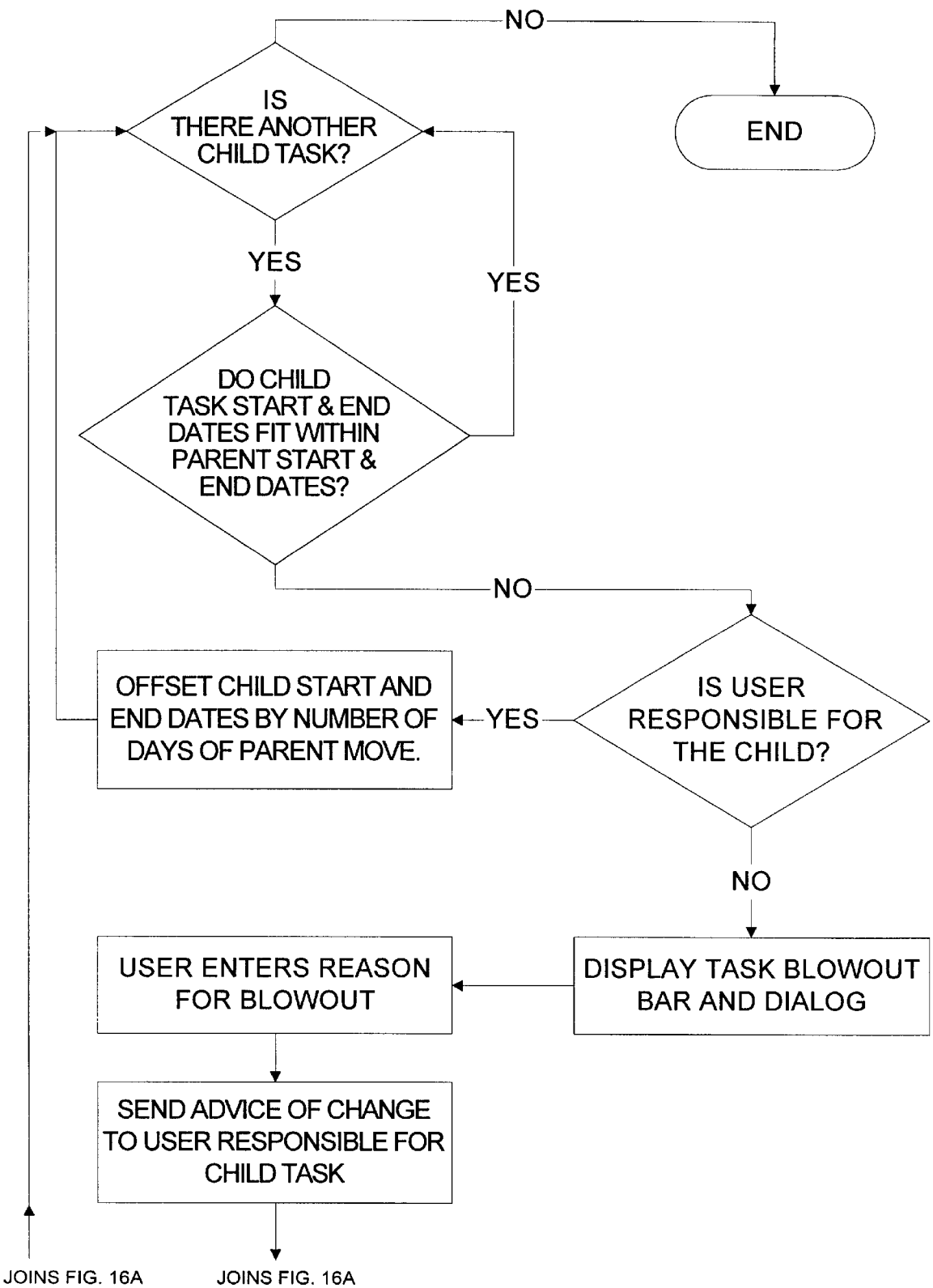
FIG. 16 - COORDINATING AND SHARING LEVEL 3 - PARENT TASK BLOWOUT

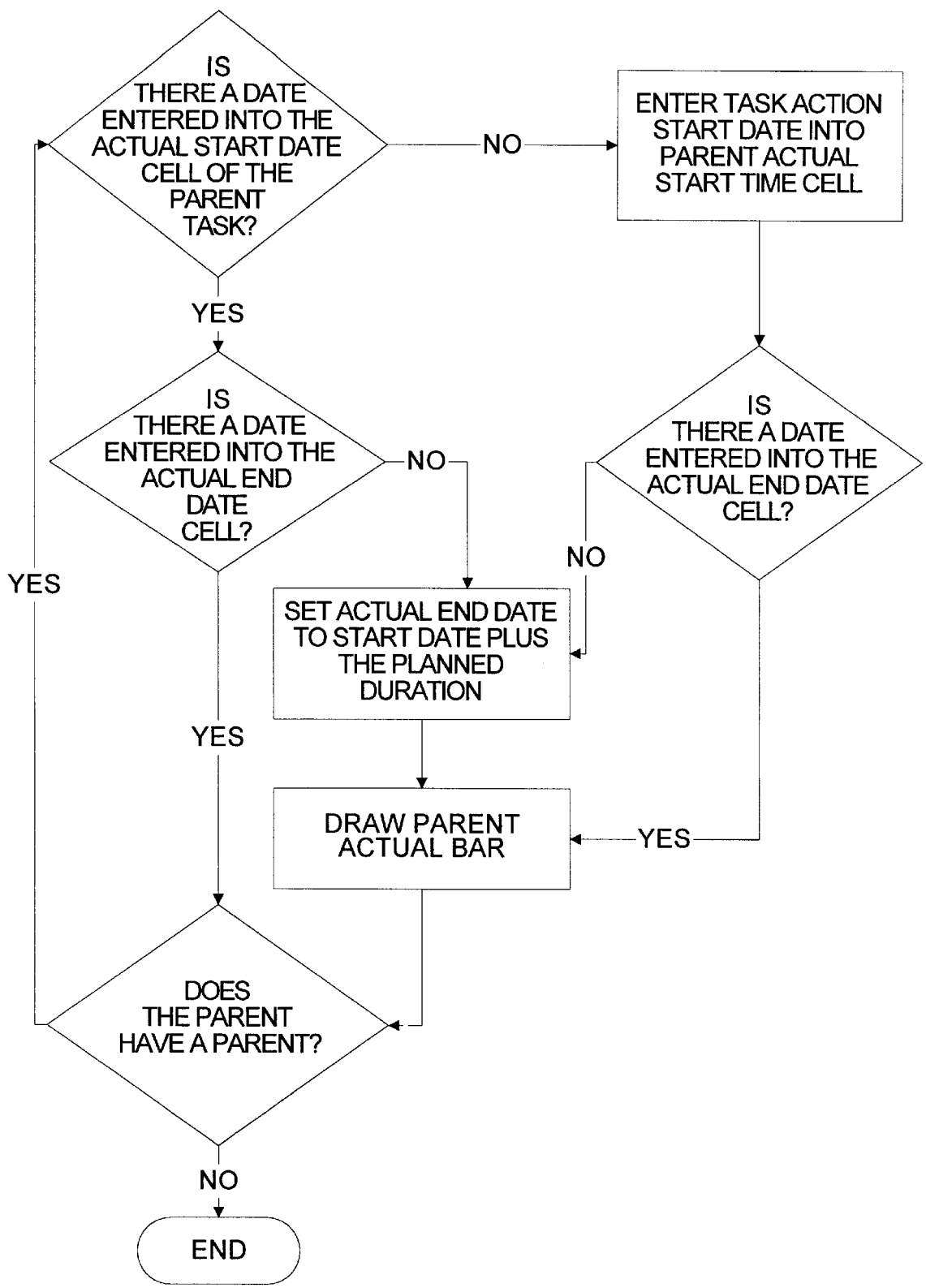
FIG. 17 - COORDINATING LEVEL 3 - CHECK PARENT START

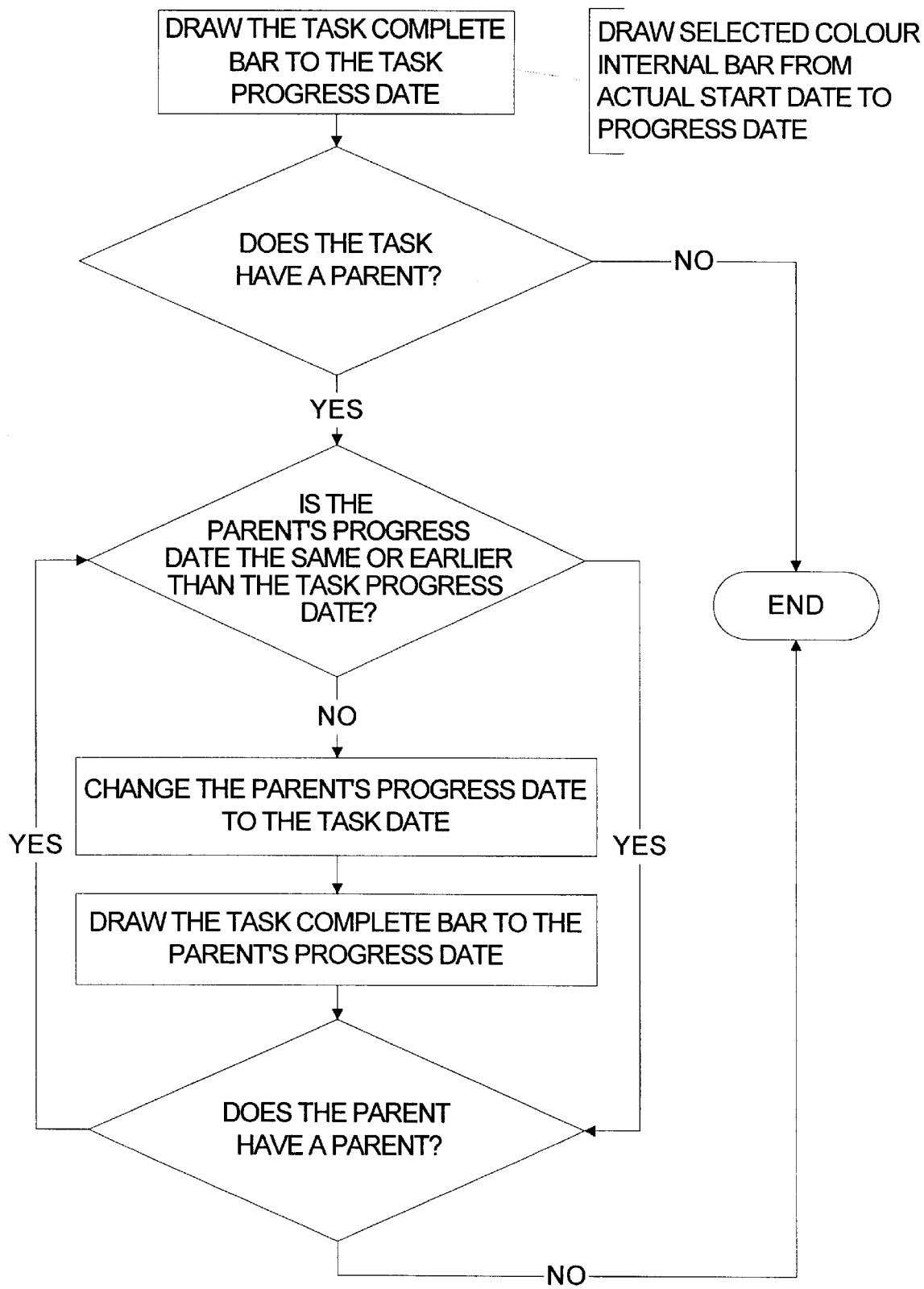
FIG. 18 - COORDINATING LEVEL 3 - UPDATE TASK PROGRESS

FIG. 19 – REPRESENTATIVELY ILLUSTRATED SYSTEM
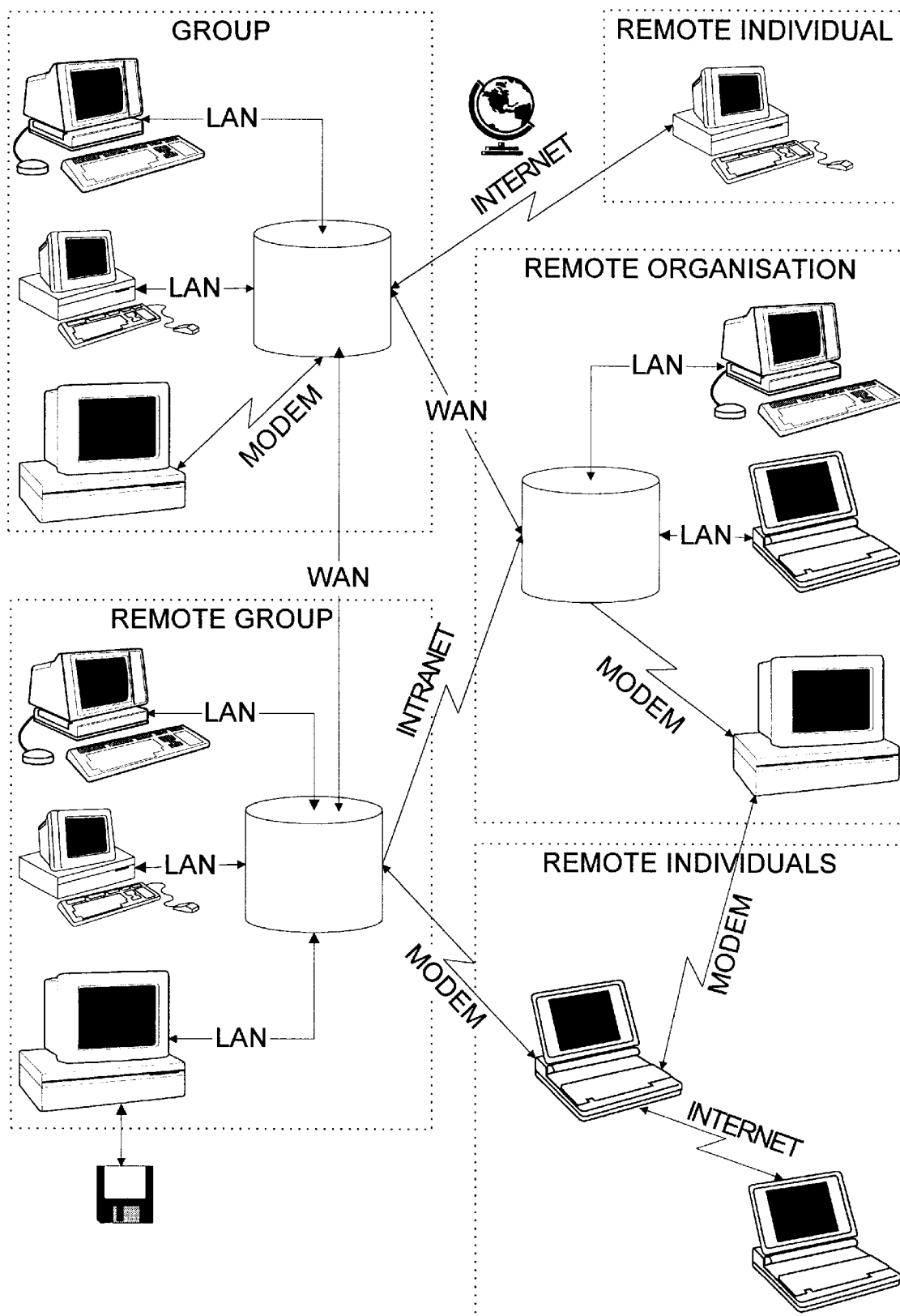

TASK MANAGEMENT SYSTEM

TECHNICAL FIELD

This invention relates to a task management system and to a method of task management.

The invention has particular but not exclusive application to a method of managing a plurality of tasks to be carried out by a plurality of personnel wherein each of the tasks has task details relevant thereto.

BACKGROUND OF INVENTION

Project management methods are well known. They are often used to help people coordinate and share task details and are designed to help the project manager control a particular project or series of sub-projects by top-down control directives. Although known methods and processes work well for the project manager, they lack the flexibility and ease of use required by those carrying out the many tasks usually needed for completion of the project. On the other hand, people directly involved in the project need to be able to work as teams and to integrate many tasks that may not be directly involved in the project and known project management systems are generally unsuitable for their needs.

Because project management tasks are generally linked by dependencies, moving one task automatically affects all dependent tasks. Known project management techniques tend to become inadequate if applied to routine tasks and multiple tasks across many projects as is common in general management.

Personal Information Management Software (PIMS) such as scheduling, diary and organiser software are known for keeping track of actions to complete tasks. However they provide little assistance in planning all but very simple tasks, and their resource management capacity is minimal. Furthermore, planning methods are not linked to individual diaries in these systems and consequently longer term tasks are not effectively linked to the daily actions required to implement these tasks.

Groupware software such as Lotus Notes is known and employs form based methods for combining task information. Lotus Notes addresses the communication and replication of data but does not address the workplace issues covered in this process.

Security methods in known project management systems, PIMS and groupware software are generally based on restricting access to designated task details. These methods are usually inflexible and do not correspond with the way people actually work. They become unworkable in the multiple task environment most people face on a daily basis.

In known groupware software, unauthorised people are prevented from viewing and/or changing task details by software security means, such as passwords. Consequently if task details are shared between unnecessary personnel, conflicts can arise which a user must resolve. It is desirable to utilise a coordinated method which displays task details to a given person only if the details are relevant to that person.

SUMMARY OF INVENTION

The present invention aims to provide an alternative to known methods and systems of task management.

This invention in one aspect resides broadly in a method of managing a plurality of tasks to be carried out by a plurality of personnel, each of the tasks having identified task details relevant thereto, the method including:

identifying task personnel who will be directly involved in carrying out each task;

allocating sole responsibility for each task to a task controller, and transferring task details to and/or between task personnel and controllers such that task details relevant to a task are provided to and accessible by only the task controller and the task personnel for the task;

wherein recommendations for modifying task details relevant to a task can only be made by task personnel for the task, and wherein a task or task details for a task can only be modified by the task controller for the task and/or an administrator;

the method utilising a data processing assembly operable under the control of program means embodied on a machine-readable storage medium that provides a task management system for coordinating the plurality of tasks, the task management system including:

transfer means for transferring the task details to and/or between the task personnel and controllers;

recommendation protocol means for establishing a protocol that the recommendations for modifying task details relevant to a task can only be made by the task personnel for the task, and modification protocol means for establishing a protocol that the modifications to a task or the task details for a task can only be made by the task controller for the task and/or the administrator.

The tasks and task details can be identified by any suitable means. It is preferred that the task details are related and identified by a task breakdown structure.

Upon being transferred the task details may be brought to the attention of relevant personnel by a number of methods. Thus for example there may be audio prompts or messages provided or alternatively paper messages can be forwarded. However it is preferred that the task details when transferred are displayed to the task controller and the task personnel.

In a preferred embodiment a task or task details for a task are modified by any one or more of the following operations:

moving a single task;

moving a block of tasks;

deleting a task;

completing a task action;

merging tasks;

merging task details;

copying and pasting a task, and templating a task.

It is also preferred that an operation listed above includes one or more of the following:

adjusting the details of a task in accordance with child task time blowout;

adjusting the details of a task in accordance with parent task time blowout;

checking that a parent task is started when a child task of the parent has begun, and updating progress of a parent task when progress of a child task of the parent has changed.

In another aspect this invention resides broadly in a management system for coordinating a plurality of tasks to be carried out by a plurality of task personnel identified as being directly involved in carrying out each task and controlled by a task controller having sole responsibility for each task, each of the tasks having task details relevant thereto, the system including:

transfer means for transferring task details to and/or between task personnel and controllers such that task details relevant to a task are provided to and accessible by only the task controller and the task personnel for the task;

recommendation protocol means for establishing a protocol that recommendations for modifying task details relevant to a task can only be made by task personnel for the task, and modification protocol means for establishing a protocol that modifications to a task or task details for a task can only be made by the task controller and/or an administrator.

It is preferred that each of the task personnel, each task controller and the administrator is provided with a computer and that the transfer means comprises a plurality of transient communication linkages between data storage means storing data relating to the task details and the computers of the task controller and the task personnel.

It is further preferred that the transient communication linkages are established and removed under the control of a computer program. It is also preferred that the protocols are established under the control of the computer program which constitutes the protocol means.

The system can be used manually. However as indicated above it is best implemented by using software and consequently in another aspect the invention resides broadly in a computer program embodied on a machinereadable storage medium that provides a management system for coordinating a plurality of tasks to be carried out by a plurality of task personnel identified as being directly involved in carrying out each task and controlled by a task controller having sole responsibility for each task, each of the tasks having task details relevant thereto, the system including:

transfer means for transferring task details to and/or between task personnel and controllers such that task details relevant to a task are provided to and accessible by only the task controller and the task personnel for the task;

recommendation protocol means for establishing a protocol that recommendations for modifying task details relevant to a task can only be made by task personnel for the task, and modification protocol means for establishing a protocol that modifications to a task or task details for a task can only be made by the task controller and/or an administrator.

In a further aspect this invention resides broadly in a method of managing a plurality of tasks to be carried out by a plurality of personnel, each of the tasks having identified task details relevant thereto, the method including:

identifying task personnel who will be directly involved in carrying out each task;

allocating sole responsibility for each task to a task controller, and transferring task details to and/or between task personnel and controllers such that task details relevant to a task are provided to and accessible by only the task controller and the task personnel for the task;

wherein recommendations for modifying task details relevant to a task can only be made by task personnel for the task, and wherein a task or task details for a task can only be modified by the task controller for the task and/or an administrator.

The process can be applied manually. However it is best facilitated by the use of software and consequently in another aspect the invention resides broadly in a method of using a computer for managing a plurality of tasks to be carried out by a plurality of personnel, each of the tasks having identified task details relevant thereto, the method including:

identifying task personnel who will be directly involved in carrying out each task;

allocating sole responsibility for each task to a task controller, and transferring task details to and/or between task personnel and controllers such that task details relevant to a task are provided to and accessible by only the task controller and the task personnel for the task;

wherein recommendations for modifying task details relevant to a task can only be made by task personnel for the task, and wherein a task or task details for a task can only be modified by the task controller for the task and/or an administrator.

DESCRIPTION OF DRAWINGS

In order that this invention may be more easily understood and put into practical effect, reference will now be made to the accompanying illustrations which show preferred embodiment of the invention, wherein:

FIG. 1 illustrates a breakdown structure for the identification of relevant tasks in many projects and many tasks and shows how direct involvement is employed to build a display of relevant tasks and a Gantt chart;

FIG. 2 illustrates a plan data input template wherein data is input relating to the person responsible and to those directly or indirectly involved in carrying out a task;

FIG. 3 is a level 1 flow chart illustrating an overview of the task management system and method in accordance with the present invention and shows the relationship between level 2 sub-processes;

FIG. 5 is a level 2 flow chart illustrating the determining of involvement and shows how direct involvement is related to the person responsible when a task is created;

FIG. 6 is a level 2 flow chart illustrating the displaying or filtering of tasks and shows indicative options for filtering task views;

FIG. 7 is a level 2 flow chart illustrating moving a single task and shows the steps for moving a task relative to other tasks;

FIG. 11 is a level 2 flow chart illustrating the merging of tasks and shows how a task is merged into another task;

FIG. 13 is a level 2 flow chart illustrating the copying and pasting of tasks and shows the steps in copying and pasting tasks;

FIG. 17 is a level 3 flow chart illustrating a sub-set of the Task Action Completed flowchart of FIG. 10 in which ensures that a parent task is started when one of the child tasks of the parent is started;

FIG. 18 is a level 3 flow chart illustrating a sub-set of the Task Action Completed flowchart of FIG. 10 in which progress of a parent task is updated when one of the child tasks of the parent is changed, and FIG. 19 illustrates a typical application of the system present invention in use.

DESCRIPTION OF PREFERRED EMBODIMENT OF INVENTION

Figure 4A:
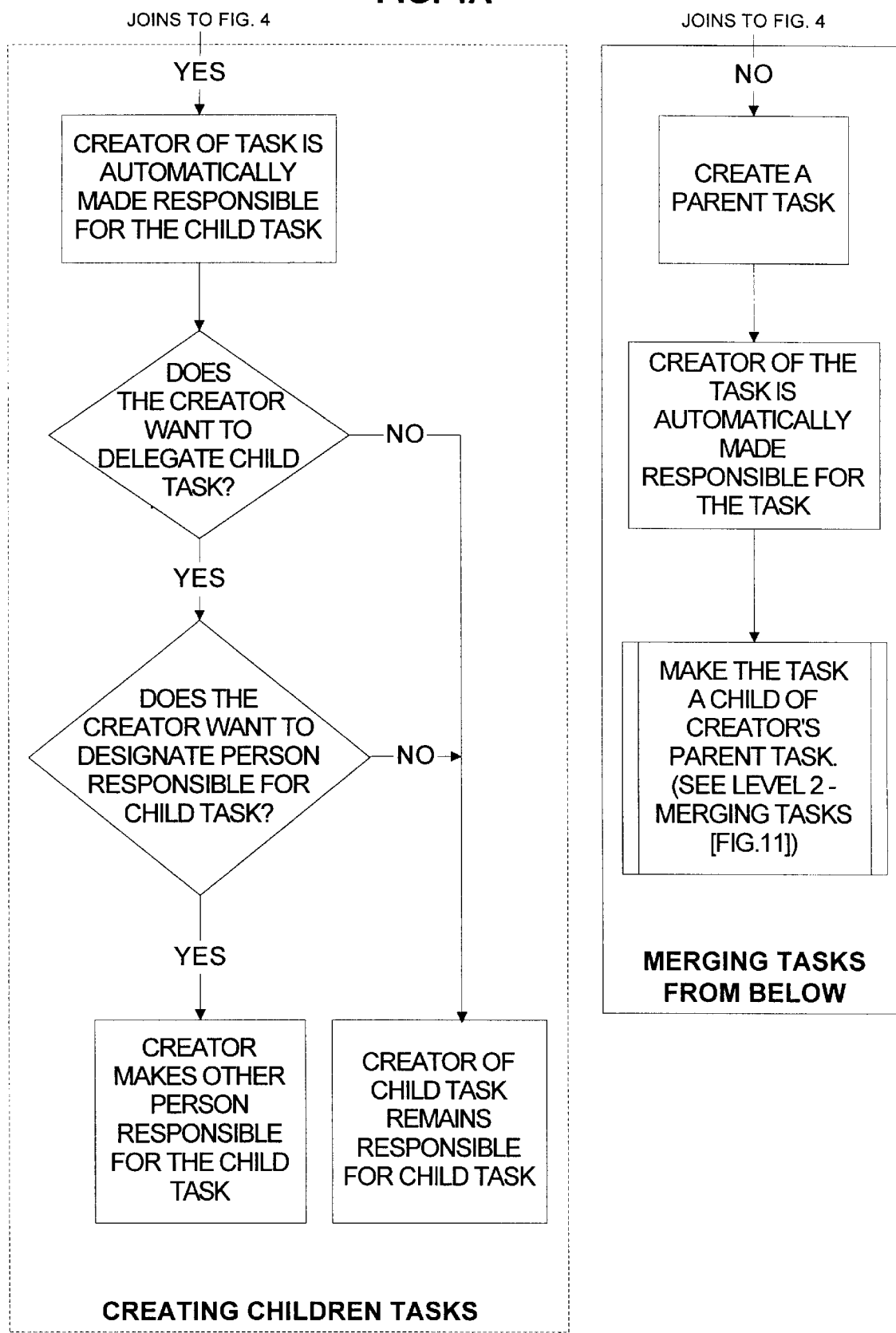
FIG. 4 is a level 2 flow chart illustrating the determining of responsibility and shows how task responsibility is determined for both top down and bottom up planning methods.
Figure 8A:
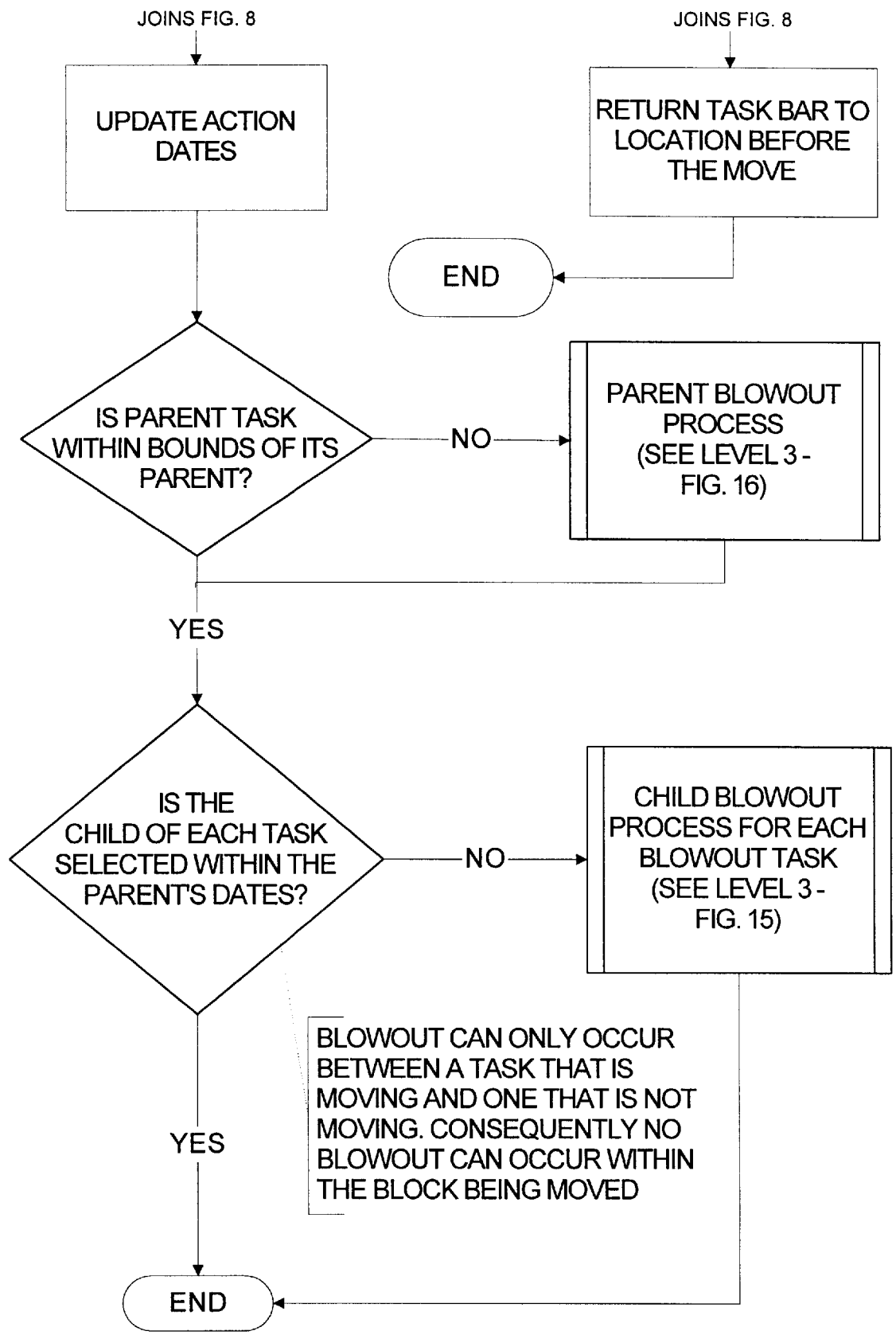
FIG. 8 is a level 2 flow chart illustrating moving groups or blocks of tasks and shows the steps for moving a block of tasks relative to other tasks.
Figure 9A:
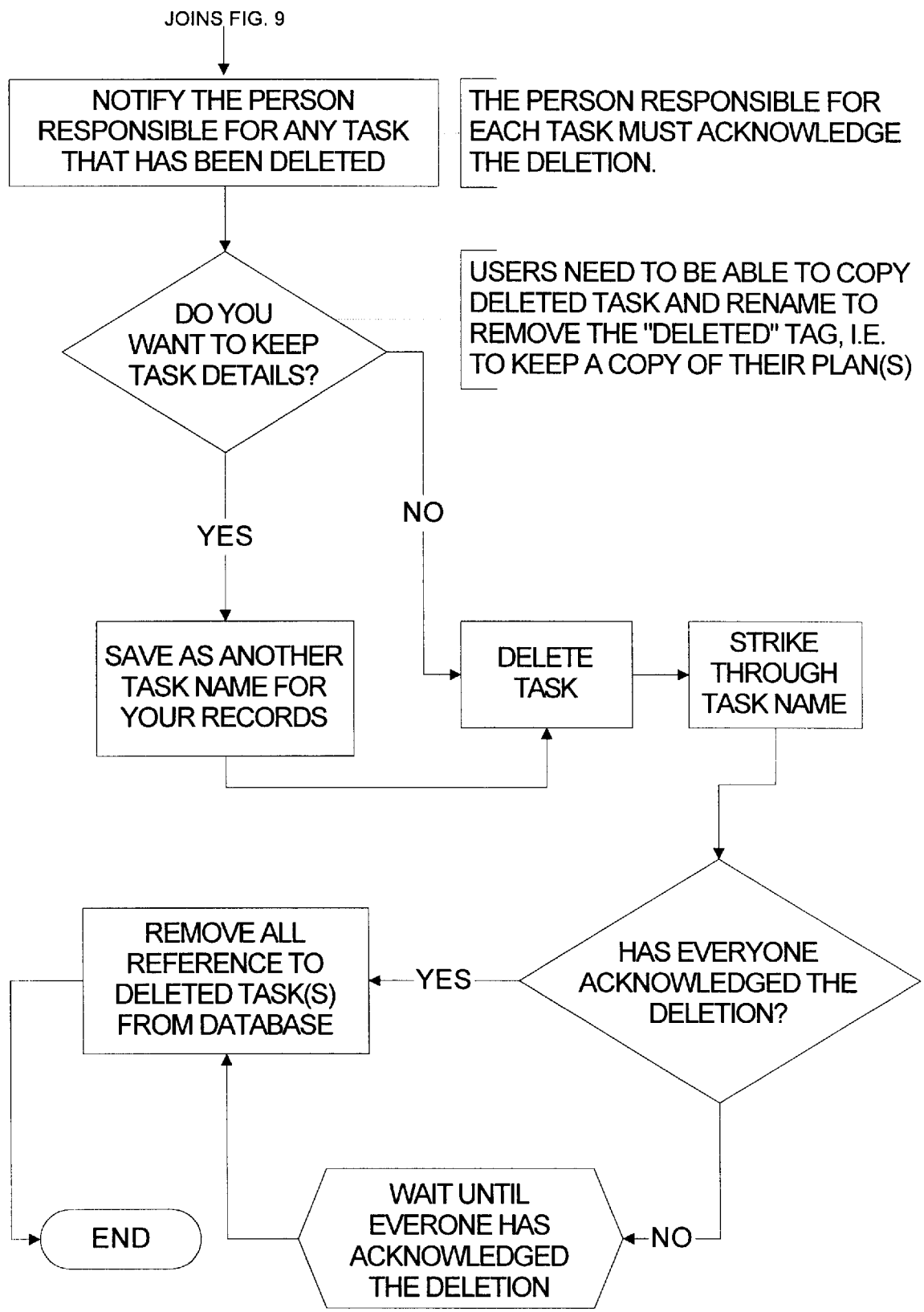
FIG. 9 is a level 2 flow chart illustrating the deleting of tasks and shows how a task can be deleted.
Figure 10A:
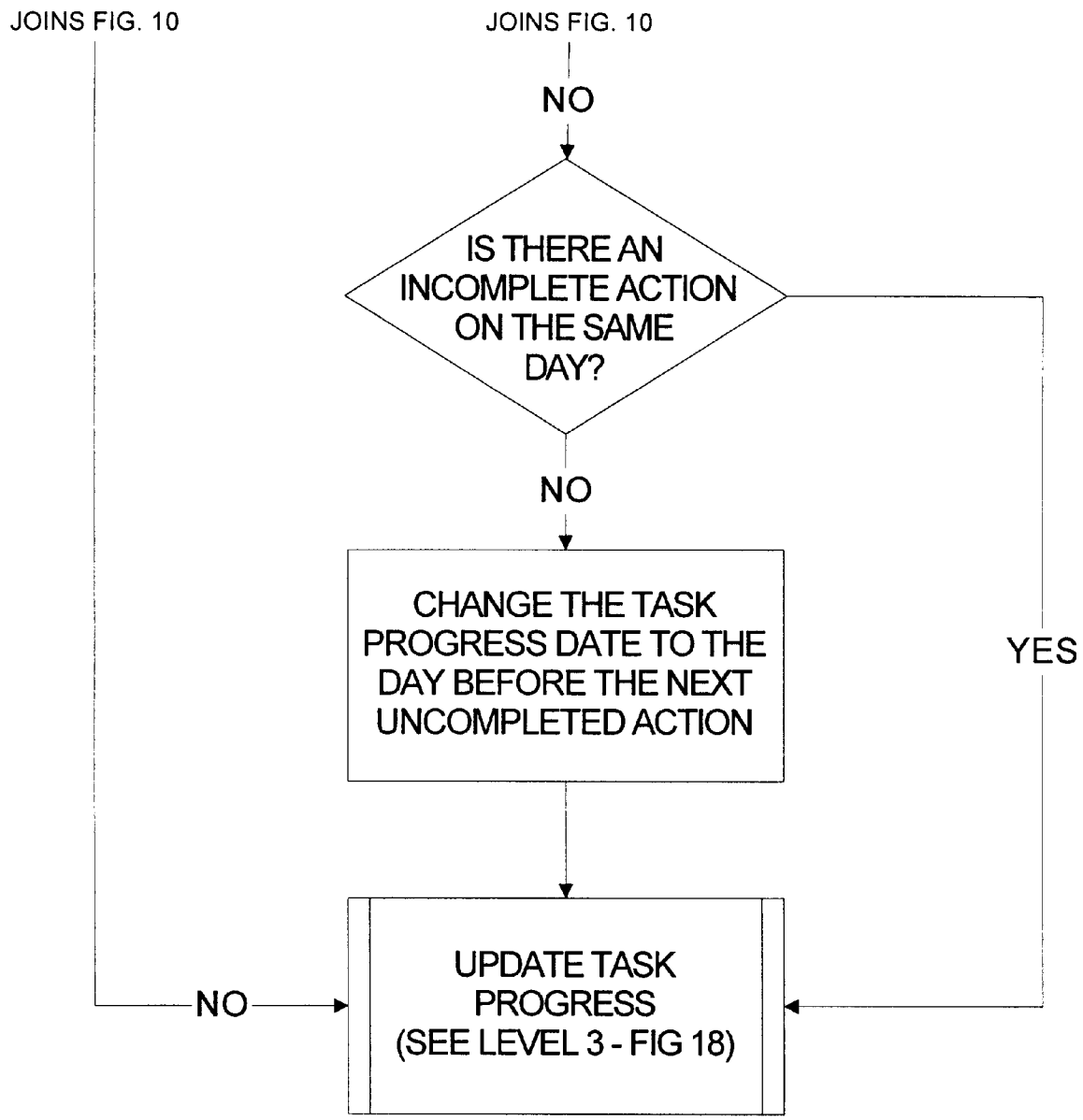
FIG. 10 is a level 2 flow chart illustrating the recording and reporting of the completion of an action.
Figure 12A:
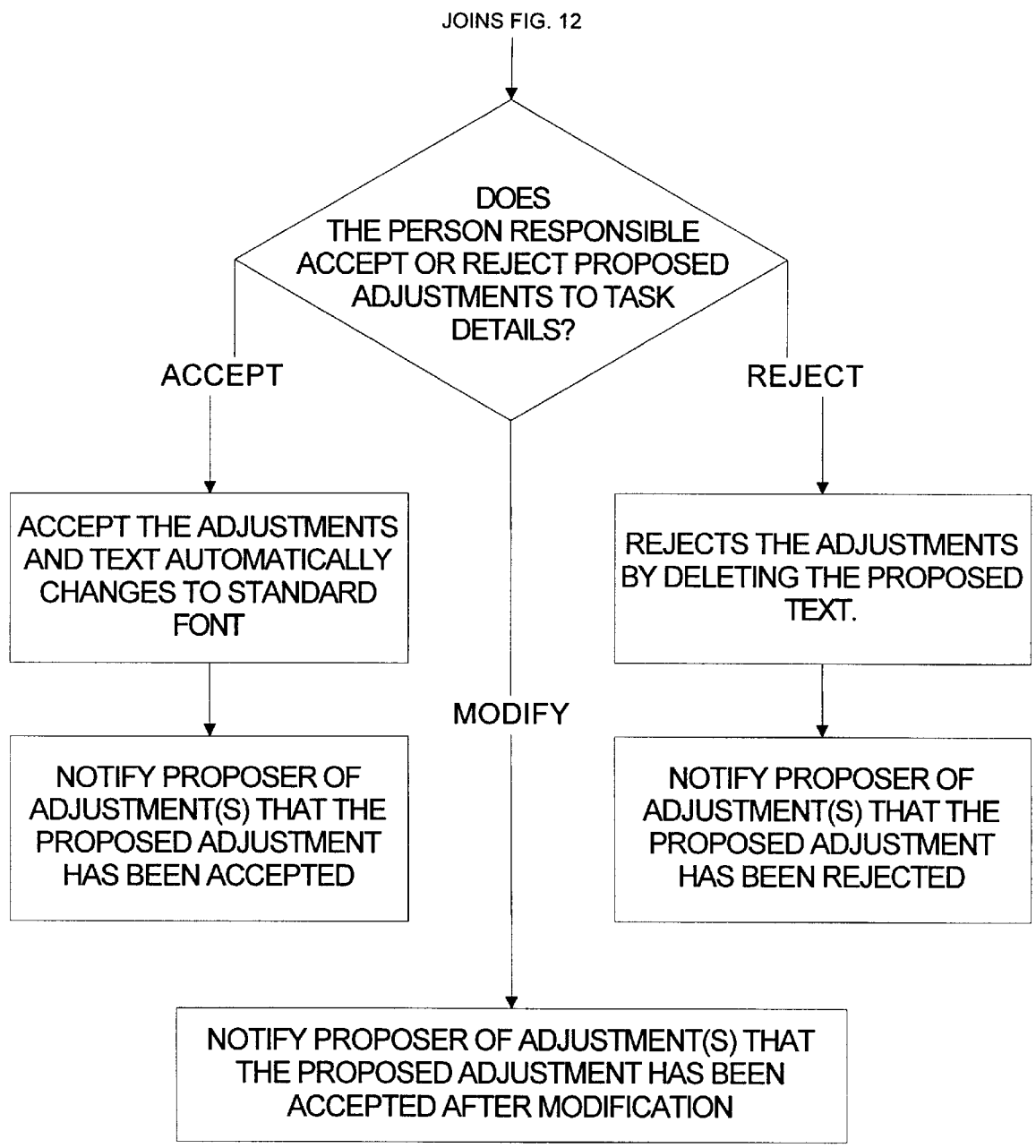
FIG. 12 is a level 2 flow chart illustrating the merging of task details and shows the sub-process for recommending and accepting changes in task details.

Throughout the description and drawings various terms and expressions are used with meanings as per the following definitions.

Action n. process of acting, exertion of influence or energy

The exertion of influence or effort that contributes to the completion of a task. Actions generally take less than a day to complete and equate to a diary entry.

Aim n. ambition, target, end, destination

The reason for undertaking the task or task part.

What the plan is intended to achieve. A correct aim should produce a "Yes" answer to the following questions:

(i) Will the aim secure a definite favourable result?

(ii) Does the wording express exactly what it is desired to bring about, and yet give no indication on how to achieve it?

(iii) Is it in accordance with instructions and responsibilities?

(iv) Has it a reasonable chance of success?

(v) Is it the utmost that can be done?

Coordinate v. bring parts into proper relationship

Coordinating processes are used to manage how a task is displayed and modified. Usually only one person is involved in the application of the process.

Involvement n. involving or being involved

Task relationships are governed by the type of involvement that a person has in a task. Involvement can be direct or indirect.

Management n. administration, control, supervision

The administration of a business concern or public undertaking. Management includes the actions of planning, organising, directing, coordinating, controlling and evaluating the use of people, money, materials and facilities to accomplish missions and tasks.

Organisation n. organised body or system or society

A convenient grouping of teams organised to achieve a mission.

Objectives n. measures of success, concrete measure, end

The objectives for a task should provide a picture of what success looks like. They should be written in concrete terms and state how success will be measured. For example, "improved productivity" is unclear. A 0.0001% improvement will satisfy the objective of "improved productivity". A better measure would be to set a percentage over a given period.

Project n plan, scheme, planned undertaking in a specified time.

A project is a logical collection of tasks that must be completed to achieve the project aim. The leader of the project, who is usually called the project manager, uses both project management and general management methods to complete the project on time, on cost and to the desired performance standards.

Responsibility n. liable to be called to account

The creator of a task has initial responsibility by default. The creator can change this responsibility if someone else becomes responsible for the task. The person responsible can create sub-tasks and make other people responsible for the sub-tasks.

Tasks and/or task details can only be modified by the person responsible for the task.

Schedule n. list of events, timetable, inventory

A schedule is a list of tasks. There is no limit on the number of schedules that can be created. However, people usually want to know how tasks affect each other.

Schedules can have any number of tasks and range from a list of daily tasks to a detailed plan for a single project. The contents of most schedules are constantly being updated to match task and environmental changes.

Schedule Chart n. Bar Chart, Gantt Chart, Task-Time Chart

A Schedule chart (sometimes called a Bar or Gantt Chart) is used to provide a graphical view of the task-time relationship. The task break down structure indicates the relationship of tasks, and horizontal bars across vertical time lines show when the task is planned to be done. The overall task horizontal bar shows the overall time limits of the task (ie. It spans all the parts of a task).

Share n. a part one gets or contributes

Sharing processes are used to share tasks and task details between people.

Task n. job, assignment, duty

A task is what is being done, has been have done or will be done. The task may be imposed or be voluntarily undertaken. Key elements of any task are:

(i) Someone has to do something, and (ii) It takes time to complete.

Tasks can be any size and involve one person to many people. Examples of tasks include supervising a project, filing documents, organising a meeting, writing a report, routine administration, chairing a meeting, conducting a survey, routine maintenance.

Task Details n. key task information

Task details provide a concise summary of the key information in a plan. The type of information required varies from plan to plan. However a task plan should contain the following details:

(i) Aim (ii) Assumptions (iii) Objectives (iv) People Involved (v) Person Responsible (vi) Actions (vii) Resources (viii) General Notes Task Breakdown a. disaggregate task The overall task (What is to being done) is always placed at the top. This task is then broken into smaller tasks (parts) which describe how the task will be done. Task parts may be logical components of the overall task used to break up the overall task into manageable chunks or they may be parts of tasks that will be supervised by subordinates. An example of a task break down is shown below.

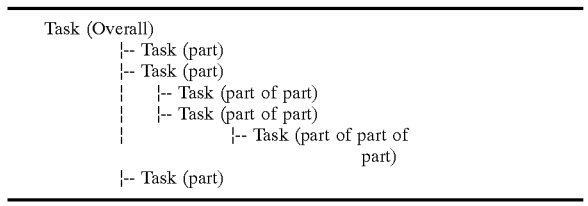

Team n. close-knit crew, company, gang, squad, contingent, corps

People cooperating and combining their efforts to achieve a common aim.

Template n. guide, pattern

A template is a copy of a past task that provides a sound framework for planning a similar future task. Templates save time and facilitate continuous improvement when they are improved after each use.

Workgroup

People with a range of skills brought together to do tasks that contribute to the organisation's mission. A workgroup's potential will not be realised unless they work as a team.

The method illustrated in broad terms in the flowchart of FIG. 3 is a process for coordinating, sharing and securing task details between people. The process manages the relationships and business rules that allow people with access to appropriate hardware and software to display, coordinate, share and secure task details for the tasks in which they are involved. The process provides the means for two or more people to coordinate, share and secure task details. The process is applied to tasks usually presented in the form of a common task breakdown structure such as a Gantt or Bar Chart as illustrated in FIG. 1.

This illustration shows how a Gantt or bar chart display of relevant tasks is constructed using direct involvement. Only tasks where a particular individual is directly involved are shown as this reduces complexity and information overload.

As illustrated in the flow chart of FIG. 3, a series of core procedural steps under the control of key protocols are applied to the identified tasks and task details. One person alone is made responsible for each task and only that person can change the task or task details. For each task, a determination is made of which personnel are involved directly and indirectly and while personnel indirectly involved may influence the task, they do no actions and see no details. For each task, relevant details are displayed to personnel but only those personnel who are directly involved.

If personnel directly involved in a task are satisfied with the security for each task, ie whether all people identified as being directly involved and hence having access to task details are appropriate, suitable etc, they have the ability to modify tasks and task details. Modification may either be by means of various coordinating processes or sharing processes.

The main functional elements of the process are:
(i) Coordinating information by ensuring that task details are synchronised between people and relevant task details are provided to people involved in tasks.
(ii) Sharing information by passing task details between people and/or changing the relationships between tasks.
(iii) Securing information by providing a simple means for everyone to control access to their task details.

The above functional elements of the process are implemented in accordance with a number of core business rules as follows:

(i) One person only is responsible for each task,
(ii) Only those people directly involved in a task have access to task details,
(iii) Task detail can only be changed by the person responsible for the task,
(iv) Recommendations to change a task detail can only be made by people directly involved in a task.

The system follows the above unique suite of four core business rules and applies these business rules to coordinating, sharing and security tasks.

These core business rules are generic and easy to understand. When applied, they lead to sound communications and more certainty about what needs to be done by the person responsible for a task and the people directly involved in the task. The main functions of the process: coordinating, sharing and security show how the core business rules are applied to any situation where people are working together. The key to coordinating, sharing and securing tasks is that one person is responsible for each task and only the person responsible can change task detail for the task. Moreover, everyone directly involved in a task can display the task details and make recommendations to the person responsible, who can either accept or reject the recommendations.

As can be seen with reference to the flowchart of FIG. 4 which shows how the responsibility for a task is determined and how responsibility can be delegated, the creator of a task is always initially responsible for the task by default. Only the creator can change this responsibility. The flow chart shows how responsibility is handled in both top down and bottom up task creation.

Tasks and/or task details can only be modified by the person responsible for the task. Thus a controller can allocate responsibility for a component of the task (sub-task) to another person, ie they can delegate the authority to manage and modify the sub-task. Then the person responsible for the sub-task can modify the sub-task. In special circumstances, the person responsible can change who is responsible to "Public", in the sense that anyone can then change the task and/or task details.

As can be seen in the flowchart of FIG. 5, involvement is determined to be either direct or indirect. Task relationships are governed by the type of involvement that a person has in a task.

Direct involvement relates to all people required to physically do an action—such people should be regarded as being directly involved. If a person is responsible for an action being done by someone else, the person responsible is automatically directly involved because they must ensure the action is completed. The person responsible has the ability to allow access to the task, ie to display the task, to anyone they wish by making them directly involved in the task.

Involvement is indirect when the person is not required to physically do an action, but they can indirectly influence the success of the action. People only indirectly involved do not have access to the task display.

As can be seen in FIG. 1, direct involvement in a task is used to create a display of relevant tasks. In FIG. 2 a Plan Data Input Template is illustrated which is used to record which person is responsible and whether others are directly or indirectly involved. Filling in the boxes in the template develops a useful plan and establishes input data simply and speedily. The common input format helps all users of the system to quickly gain understanding of the requirements. Such plan templates are available for each task.

The flow chart of FIG. 5 illustrates how responsibility relates to involvement. Whilst detailing the preferred method of determining involvement in a new task, the number of levels of involvement in the task can be customised to match a given environment.

The flow chart of FIG. 6 shows how relevant tasks are displayed to relevant personnel. In many cases this display will contain tasks that may not be immediately relevant to what is being done. The display or filtering allows a person to reduce the size of a task list by setting relevant criteria. Relevant tasks may be in projects and/or in stand alone tasks.

Coordinating, sharing and securing task details are all affected by who is responsible and who is directly involved. The ways in which responsibility and direct involvement influence various task modifications are shown in the second level flow charts of FIGS. 7 to 14.

The modification of task details can be coordinated in a number of ways.

Figure 15A:
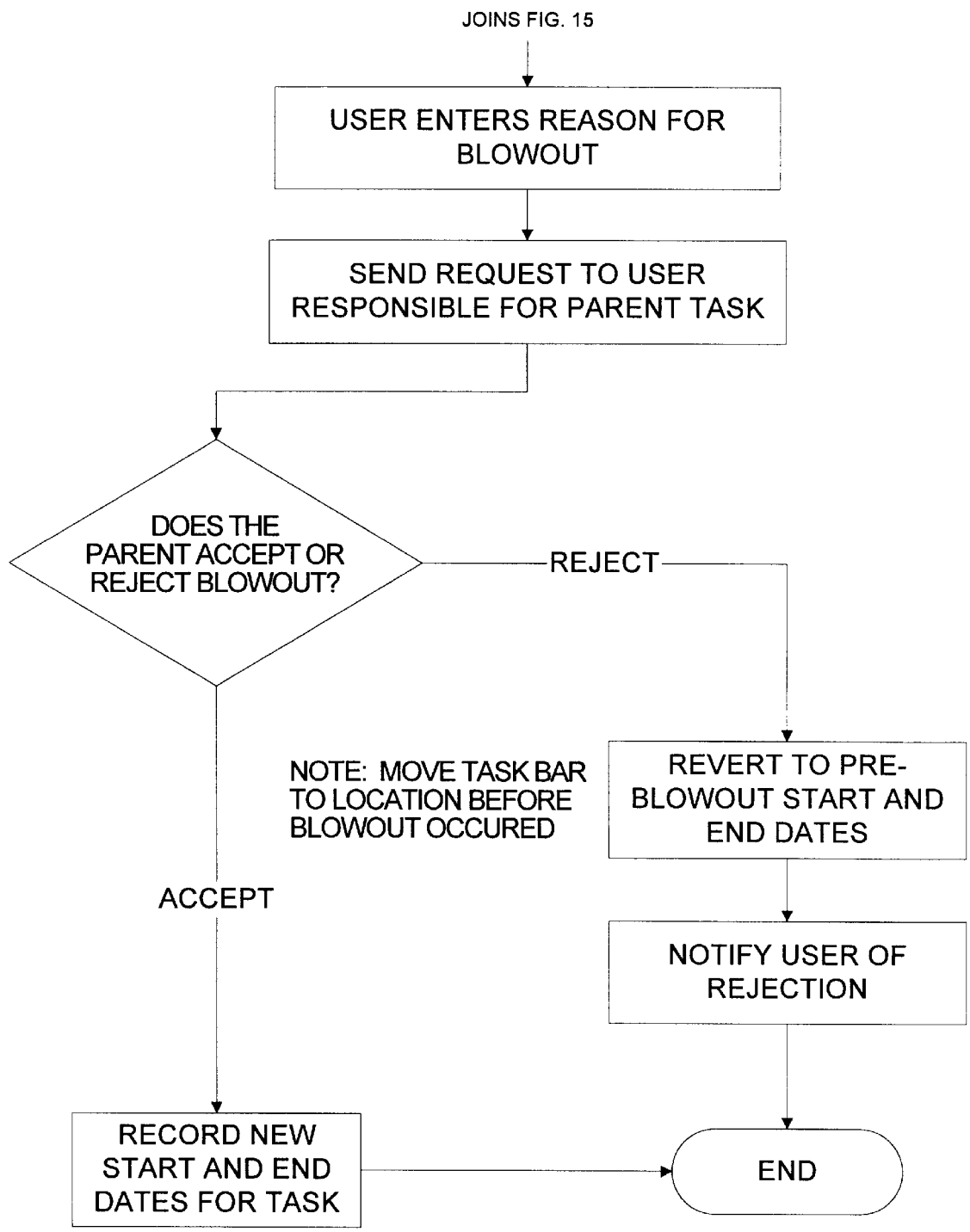
FIG. 15 is a level 3 flow chart illustrating child task blowout and shows the steps employed when a child's task dates are moved outside the parent's task dates.
Figure 16A:
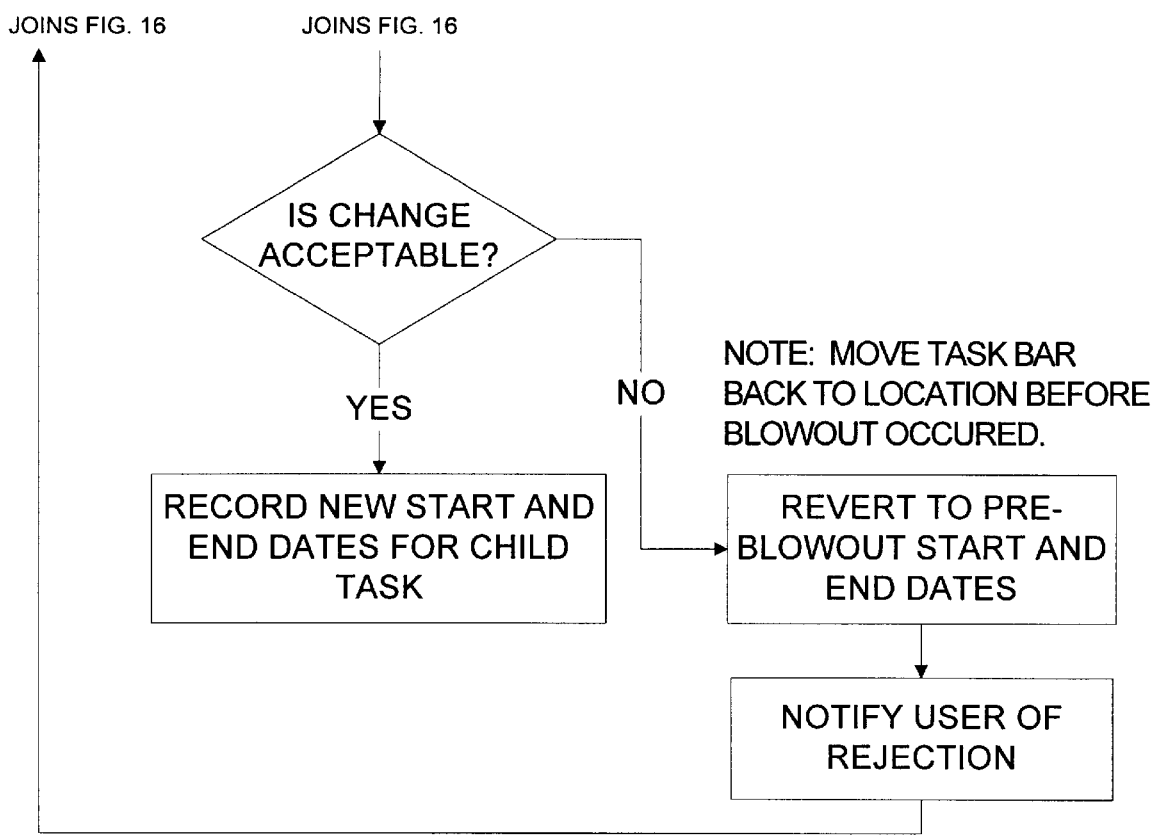
FIG. 16 is a level 3 flow chart illustrating parent task blowout and shows the steps employed when a parent's task dates are moved outside a child's task dates.

(i) Moving a single task. See FIG. 7 which shows the steps for moving a task relative to other tasks and how responsibility and direct involvement impact on changing task dates. Blowout of time in child tasks (see FIG. 15) and blowout in parent tasks (see FIG. 16) show the notifications and approvals required to move a task.

(ii) Moving Groups or blocks of tasks. See FIG. 8 which shows the steps for moving a block of tasks relative to other tasks and how responsibility and direct involvement impact on changing task dates. Blowout of time in child tasks (see FIG. 15) and blowout in parent tasks (see FIG. 16) show the notifications and approvals required to move a group or block of tasks.

(iii) Deleting tasks. See FIG. 9 which shows how a task can be deleted and how responsibility and direct involvement impact on deleting a task. This process is particularly relevant when a manager deletes a task that has child tasks attached.

(iv) Completing a task action. See FIG. 10 which shows how responsibility and direct involvement control the recording and reporting of the completion of an action. It also details how progress on parent tasks is displayed.

Similarly the modification of task details can be shared in a number of ways.

(i) Merging tasks. See FIG. 11 which shows how a task is merged into another task and how people can share tasks by merging them. The main importance of direct involvement is that an individual can only display tasks in which they are directly involved. Consequently communications are required between the people sharing tasks so that the person accepting the tasks can see the task to be merged. People directly involved can make recommendations but as explained above, only the person responsible can accept or reject the recommendation and update task details.

(ii) Merging task details. See FIG. 12 which shows the sub-process for recommending and accepting changes in task details and how people can share task details by merging them. As with the sharing of tasks by merging, the main importance of direct involvement is that an individual can only display task details in which they are directly involved. Similarly, communications are required between the people sharing task details so that the person accepting the task details can see the task and while people directly involved can make recommendations, only the person responsible can accept or reject the recommendation and update task details.

(iii) Copying and pasting tasks. See FIG. 13 which shows the steps in copying and pasting tasks. The main importance of direct involvement is that an individual can only display tasks in which they are directly involved. Consequently communications are required between the people sharing tasks so that the person accepting the tasks can see the task to be cut and the location where it is to be pasted. As with merging, people directly involved can make recommendations but as explained above only the person responsible can accept or reject the recommendation and update task details.

Figure 14A:
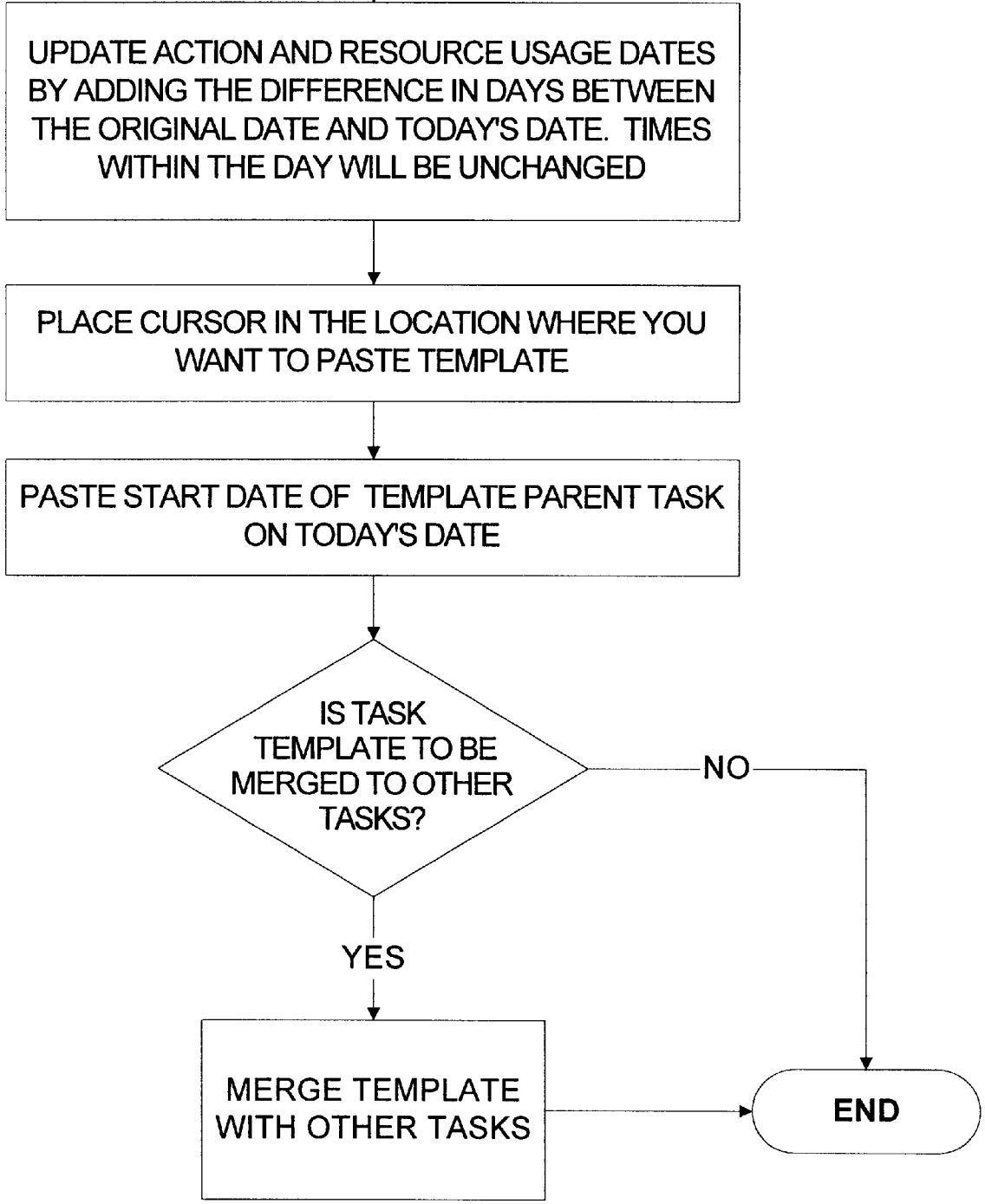
FIG. 14 is a level 2 flow chart illustrating the templating of tasks and shows the process employed to make a template of an existing task for use by another person.

(iv) Templating tasks. See FIG. 14 which shows the process employed to make a template of an existing task for use by another person. This enables people to share tasks by re-using past and current tasks. The flowchart of FIG. 14 shows the steps employed to make a template of an existing task available for use by another person.

A number of third level mechanisms are available in effecting the second level mechanisms for modifying tasks and task details by coordinating or sharing as discussed above and with reference to FIGS. 7 to 14. These third level steps include:

(i) Time blowout of a child task. See FIG. 15 which shows the steps employed when child task dates are moved outside the parent task dates. The flowchart also details the notifications and approvals required.

(ii) Time blowout of a parent task. See FIG. 16 which shows the steps employed when parent task dates are moved outside the child task dates. The flowchart also details the notifications and approvals required.

(iii) Checking parent task start. See FIG. 17 which shows a sub-set of the Task Action Completed flowchart of FIG. 10 which ensures that a parent task is started when one of the child tasks of the parent is started. This tells the person responsible for a task that a sub-task has begun.

(iv) Updating Task progress. See FIG. 18 which shows a sub-set of the Task Action Completed flowchart of FIG. 10 in which progress of a parent task is updated when one of the child tasks of the parent is changed. In accordance with this aspect of the invention progress of a task is directly related to the completion of actions rather than to a "percentage complete" notion. This tells the person responsible when the next action is due.

All task details are joined to a task. So moving a task moves all the task detail with the task. Copying a ask creates an identical copy in the new location, while leaving the original unchanged.

People not responsible for a task can recommend changes to the task details. Proposed changes are always shown in italics in a display. When the change is accepted by the person responsible for the task, the changed details are converted into a standard font.

Modifying task timings can be done within the time range allocated for a task. If the tasks are moved outside the allocated time range, a system of notifications and approvals is applied.

It will be appreciated that in use the method and system of the present invention can be applied as a paper based approach or various combinations of paper and software. However the use of purpose designed software is a preferred method of carrying out the invention.

The system of the present invention in use is representatively illustrated in FIG. 19. Data is transferred between a plurality of users having computers operating under the control of system software. The data is transferred by transfer means in the form of the transient communication linkages provided through local area networks (LANs), wide area networks (WANs), modems, the Internet, an Intranet ie Internet within an organisation, etc. Users may comprise remote individuals, a workgroup, a remote group, a remote organisation etc. In a group situation it will be seen that data is transferred between a data storage and individual users within the group. Individuals who are not in a workgroup can also be part of the system. The task information in the connected computers is updated, in compliance with system protocols, when a user logs on within the system. The information exchange updates any interconnected data storage means in respect of the tasks in which a user, ie an individual, group or organisation, is directly involved.

The schematic representation of FIG. 19 shows the flexibility of the system and illustrates some possible hardware configurations utilising the invention. The system is independent of the communication means selected to connect users and transfer data between data storage means. This enables users anywhere in the world to securely coordinate and share tasks and task details.

For example a group of users are shown in FIG. 19 connected to a data storage means ie a client server. Users are connected by cable on a LAN or they can telecommute by use of a computer connected by modem to the data storage. A remote group is shown operating separately from this group of users, but able to be connected to others on a WAN. The remote group can connect to a remote organisation via WAN or by Intranet. Similarly, remote individuals can connect to organisations, groups or other individuals by modem or Internet.

It will be understood that the number and type of computers is merely exemplary and that the only limits on the number and type of connections is the capacity of the network.

The management method and system in accordance with the present invention, in providing means for two or more people to coordinate, share and secure task details, has a number of advantages.

The process of the present invention improves upon existing general management practices and systems which are usually team or organisation specific, and hence have extreme difficulty in bringing task details together especially beyond the bound of close knit teams.

Whereas known task and project management systems usually focus on the tasks that need to be done, they store the information needed to do the tasks in a data-centric manner in that information is not linked to the task plan. The present invention provides a task-centric approach which shows the relationships between tasks, but allows for a people-centric way of looking at the tasks. Users are provided with an overview of the task, what they need to do and when, who they need to work with to complete the task and what resources are available. The system of the present invention complements known project management techniques and methods rather than replacing them.

The need to coordinate and share task details exists whenever people want to work together. This work can range from two people working together to complete a task, through larger teams, to organisations, communities, countries and even to tasks involving many countries. In most cases, people wanting to work together are physically separated. The present system provides a simple easily repeatable process to coordinate, share and secure task details between people doing tasks. The system meets the need for security arising in systems where only those people who are directly involved should see the detail of what they are doing.

Security by means of passwords can be frustrating for users and the need for passwords and other forms of security can be significantly reduced. Security is inherent in the system of the present invention in the sense that only those who need to know about task see the task details. For example if a user does not want others to see a task, the user can ensure that he/she is the only person directly involved. That is, they will see the task and everyone else will be locked out. On the other hand, an organisation-wide task (for example, a company holiday) that is to be freely available in an organisation would have all organisation members directly involved. That is everyone in the organisation would see the task on their schedule.

The system in accordance with the present invention is an improvement on those known processes which are poorly structured and do not match the way people work, or which treat people as resources and make only minimal efforts to enhance relationships between people. The present system is not fragmented or poorly integrated and does not require users to develop and apply their own means or initiatives to bring task details together. While it may be desirable for individuals to make decisions, too many decisions about basic coordination details can lead to confusion and misunderstandings that degrade the quality of relationships.

Designating people who are directly involved in a task ensures that the right people have access to a task and are informed about any changes to the task. Consequently the person responsible can ensure that all relevant people have access to critical task details.

The system in accordance with the present invention overcomes another disadvantage of many known task sharing and coordinating systems which are unique in themselves and vary in their application, and as a result have difficulty in bringing task details together electronically.

Unlike known processes where responsibilities and involvement are often unclear, this present invention helps users quickly identify, display and manipulate the task details they need to do their many tasks and projects. The process involves one person being responsible for each task and explicitly identifying the people involved in each task. Displays of tasks to be done are presented from the personal or team perspective of the people involved.

Because only one person is responsible for and able to change task details, confusion about the latest version of task details can be eliminated. This is significant when multiple users are accessing a database, when databases are merged or when task details are updated on a computer that is not continuously connected to the database. Other people directly involved in a task can make recommendations to change task details, but the person responsible is the only person who can incorporate the recommendations.

Data synchronisation is facilitated because only one person (the person responsible for the task) can change task details. This means that the latest change is always the most current version of task details. Other people directly involved in a task can make recommendations to change a task's detail, but the person responsible is the only person who can incorporate the recommendations.

Proposed changes to a task are automatically communicated to the people involved, so a user is assured that everyone who needs to know has access to the changes. Furthermore, because changes are logged, if a user is absent for a period of time he/she can be updated by working through the changes made during their absence.

This process allows people to work separately on any task(s), then to share and coordinate critical task details. All personnel involved in the task can see what they need to do, what other people are doing and the status of the task(s) they are involved in. Because of the security aspects in the present invention, at any time a person responsible for a task can change the people who can access the task simply by changing their involvement in the task. Because access is controlled by the person responsible for a task, the process is ideally suited for use on insecure systems such as the Internet.

The system in accordance with the present invention is an improvement on those known management methods which do not provide the level of detail best required for consistency across many workplaces and cultures. Known processes are also generally theoretical and complex making them difficult to understand and apply. Furthermore, existing processes are frequently fragmented and poorly integrated with each separate group of people who want to work together deciding on the processes they or their individual group will employ. The resulting multitude of processes usually makes it very hard to integrate task details with other people and in many cases the processes are reinvented for each task so that continuous improvement is difficult to achieve. Completing a particular task or project creates a template for future use. These templates provide a sound basis for continuous improvement.

Public information about events and tasks can be easily incorporated into personal diaries. Connecting to any database having public information will bring the public tasks and their details into a user's schedule.

The tasks for an organisation can be linked from the strategic level, through project plans and task plans to individual diaries. The links made via tasks also maintain continuity from top to bottom. Individuals can add their daily tasks as well as their involvement in projects beyond the organisation to generate a comprehensive list of tasks across the whole system. Even though this may amount to tens of thousands of tasks, each individual will see only those tasks in which they are directly involved. This reduces the potential for information overload to occur.

Geographically separated people can work together effectively because they have complete control over their own tasks, including how their tasks are integrated into schedules.

The process supports top down and bottom up development of plans. Suggestions by individuals can easily be developed and moved up through the organisation structure, thereby enhancing the plan and its applicability at each step.

Senior management can quickly obtain aggregated information on progress of a task. However to obtain detail from lower levels in an organisation management must communicate with team members who are directly involved.

When presented in mass market software, the process has the capacity to encourage team work, clarify working relationships and help people remain focused on what they need to do to be successful.

Furthermore, the process has a number of additional advantages. People can easily share what they are doing with other people. Information relevant to each individual doing a task is presented. Control over which version of the task details is facilitated. Proposed changes to the task are communicated automatically to the people directly involved. An audit trial can be automatically generated by recording changes to tasks. A template is generated for future use. The combination of a task breakdown structure and this process facilitates the linking of plans to the diaries of people directly involved in the tasks to implement plans.

It will of course be realised that whilst the above has been given by way of an illustrative example of this invention, all such and other modifications and variations hereto, as would be apparent to persons skilled in the art, are deemed to fall within the broad scope and ambit of this invention as is herein set forth.

What is claimed is:

1. A method of managing a plurality of tasks to be carried out by a plurality of personnel, each of the tasks having identified task details relevant thereto, said method including:

identifying task personnel who will be directly involved in carrying out each task;

allocating sole responsibility for each task to a task controller, and transferring task details to and/or between task personnel and controllers such that task details relevant to a task are provided to and accessible by only the task controller and the task personnel for said task;

wherein recommendations for modifying task details relevant to a task can only be made by task personnel for said task, and wherein a task or task details for a task can only be modified by the task controller for said task and/or an administrator;

said method utilising a data processing assembly operable under the control of program means embodied on a machine-readable storage medium that provides a task management system for coordinating said plurality of tasks, said task management system including:

transfer means for transferring said task details to and/or between said task personnel and controllers;

recommendation protocol means for establishing a protocol that said recommendations for modifying task details relevant to a task can only be made by the task personnel for said task, and modification protocol means for establishing a protocol that said modifications to a task or said task details for a task can only be made by the task controller for said task and/or said administrator.

2. A method as claimed in claim 1, wherein said task details are related and identified by means of a task breakdown structure.

3. A method as claimed in claim 1, wherein said task details when transferred are displayed to said task controller and said task personnel.

4. A method of managing a plurality of tasks to be carried out by a plurality of personnel, each of the tasks having identified task details relevant thereto, said method including:

identifying task personnel who will be directly involved in carrying out each task;

allocating sole responsibility for each task to a task controller, and transferring task details to and/or between task personnel and controllers such that task details relevant to a task are provided to and accessible by only the task controller and the task personnel for said task;

wherein recommendations for modifying task details relevant to a task can only be made by task personnel for said task, and wherein a task or task details for a task can only be modified by the task controller for said task and/or an administrator;

said method utilizing a data processing assembly operable under the control of program means embodied on a machine-readable storage medium that provides a task management system for coordinating said plurality of tasks, said task management system including:

transfer means for transferring said task details to and/or between said task personnel and controllers;

recommendation protocol means for establishing a protocol that said recommendations for modifying task details relevant to a task can only be made by the task personnel for said task, and modification protocol means for establishing a protocol that said modifications to a task or said task details for a task can only be made by the task controller for said task and/or said administrator; and wherein a task or task details for a task are modified by any one or more of the following operations:
moving a single task;
moving a block of tasks;
deleting a task;
completing a task action;
merging tasks;
merging task details;
copying and pasting a task, and
templating a task.

5. A method as claimed in claim 4, wherein a said operation includes any one or more of the following:
adjusting the details of a task in accordance with child task time blowout;
adjusting the details of a task in accordance with parent task time blowout;
checking that a parent task is started when a child task of the parent has begun, and
updating progress of a parent task when progress of a child task of the parent has changed.

6. A management system for coordinating a plurality of tasks to be carried out by a plurality of task personnel identified as being directly involved in carrying out each task and controlled by a task controller having sole responsibility for each task, each of the tasks having task details relevant thereto, said system including:

transfer means for transferring task details to and/or between task personnel and controllers such that task details relevant to a task are provided to and accessible by only the task controller and the task personnel for said task;

recommendation protocol means for establishing a protocol that recommendations for modifying task details relevant to a task can only be made by task personnel for said task, and modification protocol means for establishing a protocol that modifications to a task or task details for a task can only be made by the task controller and/or an administrator.

7. A management system as claimed in claim 6, wherein each of the task personnel, each task controller and the administrator is provided with a computer and wherein said transfer means comprises a plurality of transient communication linkages between data storage means storing data relating to the task details and the computers of the task controller and the task personnel.

8. A management system as claimed in claim 7, wherein said transient communication linkages are established and removed under the control of a computer program.

9. A management system as claimed in claim 8, wherein said protocols are established under the control of said computer program which constitutes said protocol means.

10. A computer program embodied on a machine-readable storage medium that provides a management system for coordinating a plurality of tasks to be carried out by a plurality of task personnel identified as being directly involved in carrying out each task and controlled by a task controller having sole responsibility for each task, each of the tasks having task details relevant thereto, said system including:

transfer means for transferring task details to and/or between task personnel and controllers such that task details relevant to a task are provided to and accessible by only the task controller and the task personnel for said task;

recommendation protocol means for establishing a protocol that recommendations for modifying task details relevant to a task can only be made by task personnel for said task, and modification protocol means for establishing a protocol that modifications to a task or task details for a task can only be made by the task controller and/or an administrator.

11. A method of managing a plurality of tasks to be carried out by a plurality of personnel, each of the tasks having identified task details relevant thereto, said method including:

identifying task personnel who will be directly involved in carrying out each task;

allocating sole responsibility for each task to a task controller, and transferring task details to and/or between task personnel and controllers such that task details relevant to a task are provided to and accessible by only the task controller and the task personnel for said task;

wherein recommendations for modifying task details relevant to a task can only be made by task personnel for said task, and wherein a task or task details for a task can only be modified by the task controller for said task and/or an administrator;

said method utilising a data processing assembly operable under the control of program means embodied on a machine-readable storage medium that provides a management system for coordinating said plurality of tasks.

12. A method of managing a plurality of tasks to be carried out by a plurality of personnel, each of the tasks having identified task details relevant thereto, said method including:

identifying task personnel who will be directly involved in carrying out each task;

allocating sole responsibility for each task to a task controller, and transferring task details to and/or between task personnel and controllers such that task details relevant to a task are provided to and accessible by only the task controller and the task personnel for said task;

wherein recommendations for modifying task details relevant to a task can only be made by task personnel for said task, and wherein a task or task details for a task can only be modified by the task controller for said task and/or an administrator.

13. A method of using a computer for managing a plurality of tasks to be carried out by a plurality of personnel, each of the tasks having identified task details relevant thereto, said method including:

identifying task personnel who will be directly involved in carrying out each task;

allocating sole responsibility for each task to a task controller, and transferring task details to and/or between task personnel and controllers such that task details relevant to a task are provided to and accessible by only the task controller and the task personnel for said task;

wherein recommendations for modifying task details relevant to a task can only be made by task personnel for said task, and wherein a task or task details for a task can only be modified by the task controller for said task and/or an administrator.

14. A method of managing a plurality of tasks to be carried out by a plurality of personnel, each of the tasks having identified task details relevant thereto, said method including:

identifying task personnel who will be directly involved in carrying out each task;

allocating sole responsibility for each task to a task controller, and transferring task details to and/or between task personnel and controllers such that task details relevant to a task are provided to and accessible by only the task controller and the task personnel for said task;

wherein recommendations for modifying task details relevant to a task can only be made by task personnel for said task, and wherein a task or task details for a task can only be modified by the task controller for said task and/or an administrator;

said method utilizing a data processing assembly operable under the control of program means embodied on a machine-readable storage medium that provides a task management system for coordinating said plurality of tasks, said task management system including:

transfer means for transferring said task details to and/or between said task personnel and controllers;

recommendation protocol means for establishing a protocol that said recommendations for modifying task details relevant to a task can only be made by the task personnel for said task, and modification protocol means for establishing a protocol that said modifications to a task or said task details for a task can only be made by the task controller for said task and/or said administrator; and wherein a task or task details for a task are modified by any one or more of the following operations:
  moving a single task;
  moving a block of tasks;
  deleting a task;
  completing a task action;
  merging tasks;
  merging task details;
  copying and pasting a task, and
  templating a task.

15. A method as claimed in claim 14, wherein said task details are related and identified by means of a task breakdown structure.

16. A method as claimed in claim 14, wherein said task details when transferred are displayed to said task controller and said task personnel.

17. A method as claimed in claim 14, wherein a said operation includes any one or more of the following:

adjusting the details of a task in accordance with child task time blowout;

adjusting the details of a task in accordance with parent task time blowout;

checking that a parent task is started when a child task of the parent has begun, and updating progress of a parent task when progress of a child task of the parent has changed.

* * * * *